United States Patent
Jain

(10) Patent No.: US 8,996,406 B2
(45) Date of Patent: Mar. 31, 2015

(54) SEARCH ENGINE SEGMENTATION

(75) Inventor: Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 11/419,865

(22) Filed: May 23, 2006

(65) Prior Publication Data
US 2007/0179847 A1 Aug. 2, 2007

Related U.S. Application Data

(60) Provisional application No. 60/764,618, filed on Feb. 2, 2006.

(51) Int. Cl.
G06Q 30/00 (2012.01)
G06F 17/30 (2006.01)
G06Q 30/02 (2012.01)
H04L 29/08 (2006.01)

(52) U.S. Cl.
CPC ............ *G06Q 30/02* (2013.01); *G06Q 30/0277* (2013.01); *G06Q 30/0239* (2013.01); *G06F 17/30864* (2013.01); *G06Q 30/0275* (2013.01); *H04L 67/327* (2013.01); *G06Q 30/0226* (2013.01); *G06Q 30/0263* (2013.01); *G06Q 30/0256* (2013.01)
USPC ........................................ 705/14.71; 707/706

(58) Field of Classification Search
CPC ................................ G06Q 30/02; G06F 17/30
USPC .................... 705/14, 3, 14.71; 707/3, 10, 706
See application file for complete search history.

(56) References Cited

U.S. PATENT DOCUMENTS

| 5,724,521 | A | 3/1998 | Dedrick |
| 5,761,647 | A | 6/1998 | Boushy |
| 5,774,870 | A | 6/1998 | Storey |
| 5,927,391 | A | 7/1999 | Chung |
| 5,937,391 | A | 8/1999 | Ikeda et al. |

(Continued)

FOREIGN PATENT DOCUMENTS

| WO | WO0137158 A1 | 5/2001 |
| WO | WO0143034 A2 | 6/2001 |
| WO | WO2005124617 A1 | 12/2005 |

OTHER PUBLICATIONS

International Search Report for PCT Application No. US2007/002792 dated Aug. 20, 2007, 3 pgs.

(Continued)

*Primary Examiner* — Sun Li
(74) *Attorney, Agent, or Firm* — Dan Choi; Judy Yee; Micky Minhas

(57) ABSTRACT

The claimed subject matter can provide a mechanism that facilitates market segmentation among search engines. A segmentation mechanism is provided that displays a plurality of search engines that can be employed in connection with a plurality of search types. Thus, an Internet search query can be analyzed, e.g., by keywords to determine a type of search being performed, and subsequently directed to the search engine selected for that type rather than all search queries going to a single search engine. The routing of a query can be based upon a user's choices, which takes advantage of the fact that some search engines perform better than others based upon the type of search. The segmentation mechanism can be built into, e.g., an operating system, a browser and the like, and can be easily configured.

20 Claims, 14 Drawing Sheets

(56) References Cited

U.S. PATENT DOCUMENTS

| | | | |
|---|---|---|---|
| 5,937,392 A | 8/1999 | Alberts | |
| 5,960,409 A | 9/1999 | Wexler | |
| 5,963,924 A | 10/1999 | Williams et al. | |
| 6,078,866 A | 6/2000 | Buck et al. | |
| 6,129,274 A | 10/2000 | Suzuki | |
| 6,144,958 A | 11/2000 | Ortega et al. | |
| 6,178,408 B1 | 1/2001 | Copple et al. | |
| 6,269,361 B1* | 7/2001 | Davis et al. | 707/3 |
| 6,298,330 B1 | 10/2001 | Gardenswartz et al. | |
| 6,336,099 B1 | 1/2002 | Barnett et al. | |
| 6,374,228 B1 | 4/2002 | Litwin | |
| 6,385,592 B1 | 5/2002 | Angles et al. | |
| 6,401,075 B1 | 6/2002 | Mason et al. | |
| 6,405,175 B1 | 6/2002 | Ng | |
| 6,511,377 B1 | 1/2003 | Weiss | |
| 6,539,392 B1 | 3/2003 | Rebane | |
| 6,594,640 B1 | 7/2003 | Postrel | |
| 6,654,725 B1 | 11/2003 | Langheinrich et al. | |
| 6,704,727 B1 | 3/2004 | Kravets | |
| 6,732,088 B1 | 5/2004 | Glance | |
| 6,745,177 B2 | 6/2004 | Kepler et al. | |
| 6,757,661 B1 | 6/2004 | Blaser et al. | |
| 6,785,671 B1* | 8/2004 | Bailey et al. | 707/3 |
| 6,826,572 B2* | 11/2004 | Colace et al. | 707/10 |
| 6,876,997 B1* | 4/2005 | Rorex et al. | 707/3 |
| 6,907,566 B1 | 6/2005 | McElfresh et al. | |
| 6,965,868 B1 | 11/2005 | Bednarek | |
| 6,999,959 B1* | 2/2006 | Lawrence et al. | 707/5 |
| 7,007,979 B2 | 3/2006 | Mitchell | |
| 7,025,674 B2 | 4/2006 | Adams et al. | |
| 7,035,812 B2 | 4/2006 | Meisel et al. | |
| 7,039,599 B2 | 5/2006 | Merriman et al. | |
| 7,050,990 B1 | 5/2006 | Chu et al. | |
| 7,065,494 B1 | 6/2006 | Evans | |
| 7,065,500 B2 | 6/2006 | Singh et al. | |
| 7,110,993 B2 | 9/2006 | Soulanille et al. | |
| 7,152,064 B2 | 12/2006 | Bourdoncle et al. | |
| 7,302,429 B1 | 11/2007 | Wanker | |
| 7,363,302 B2 | 4/2008 | Lester | |
| 2001/0054003 A1 | 12/2001 | Chien et al. | |
| 2002/0002509 A1 | 1/2002 | Wagorn et al. | |
| 2002/0002597 A1 | 1/2002 | Morrell, Jr. | |
| 2002/0013728 A1 | 1/2002 | Wilkman | |
| 2002/0082920 A1 | 6/2002 | Austin et al. | |
| 2002/0099605 A1 | 7/2002 | Weitzman et al. | |
| 2002/0103703 A1 | 8/2002 | Spetalnick | |
| 2002/0107736 A1 | 8/2002 | Mizuno et al. | |
| 2002/0169760 A1 | 11/2002 | Cheung et al. | |
| 2002/0169764 A1* | 11/2002 | Kincaid et al. | 707/3 |
| 2002/0198551 A1 | 12/2002 | Grant et al. | |
| 2003/0033292 A1 | 2/2003 | Meisel et al. | |
| 2003/0046161 A1 | 3/2003 | Kamangar et al. | |
| 2003/0050831 A1 | 3/2003 | Klayh | |
| 2003/0055729 A1 | 3/2003 | Bezos et al. | |
| 2003/0149937 A1 | 8/2003 | McElfresh et al. | |
| 2003/0200142 A1 | 10/2003 | Hicks et al. | |
| 2003/0212595 A1 | 11/2003 | Antonucci | |
| 2003/0236704 A1 | 12/2003 | Antonucci | |
| 2003/0236712 A1 | 12/2003 | Antonucci et al. | |
| 2004/0103024 A1 | 5/2004 | Patel et al. | |
| 2004/0133471 A1* | 7/2004 | Pisaris-Henderson et al. | 705/14 |
| 2004/0193489 A1 | 9/2004 | Boyd et al. | |
| 2004/0230491 A1 | 11/2004 | Messer et al. | |
| 2005/0023346 A1 | 2/2005 | Bakker et al. | |
| 2005/0060290 A1 | 3/2005 | Herscovici et al. | |
| 2005/0086173 A1 | 4/2005 | Kalwit | |
| 2005/0097204 A1 | 5/2005 | Horowitz et al. | |
| 2005/0192863 A1 | 9/2005 | Mohan | |
| 2005/0192946 A1* | 9/2005 | Lu et al. | 707/3 |
| 2005/0240472 A1 | 10/2005 | Postrel | |
| 2005/0256809 A1 | 11/2005 | Sadri | |
| 2005/0256954 A1 | 11/2005 | Shapira et al. | |
| 2006/0026067 A1 | 2/2006 | Nicholas et al. | |
| 2006/0059062 A1 | 3/2006 | Wood et al. | |
| 2006/0085408 A1 | 4/2006 | Morsa | |
| 2006/0253319 A1 | 11/2006 | Chayes et al. | |
| 2006/0287986 A1* | 12/2006 | Westphal | 707/3 |

OTHER PUBLICATIONS

International Search Report for PCT Application No. US2007/002785 dated Jul. 19, 2007, 3 pgs.
OA Dated Jun. 23, 2008 for U.S. Appl. No. 11/419,896, 31 pages.
OA dated Nov. 17, 2008 for U.S. Appl. No. 11/419,859, 32 pages.
OA dated Oct. 27, 2008 for U.S. Appl. No. 11/419,802, 42 pages.
OA dated Jan. 7, 2009 for U.S. Appl. No. 11/419,896, 27 pages.
Office Action for U.S. Appl. No. 11/419,802, mailed on Apr. 28, 2011, Kamal Jain, "Merchant Rankings in Ad Referrals".
Byrne, "Optimizing Your Association's Revenue Through Internet Advertising", 1998, Learned Publishing vol. 11, No. 1, pp. 17-22.
Deng, et al., "Local Web Advertisement Through Dynamic Active Proxy", 2000, IEEE, pp. 1183-1186.
Novak, et al., "Advertising Pricing Models for the World Wide Web", (2000) Internet Publishing and Beyond: The Economics of Digital Information and Intellectual Property, 22 pages.
Translated Chinese Office Action mailed Jul. 13, 2011 for Chinese patent application No. 200780004397.X, a counterpart foreign application of U.S. Appl. No. 11/419,896, 12 pages.
Office action for U.S. Appl. No. 11/419,896, mailed on Aug. 28, 2012, Jain, "Ad Publisher Performance and Mitigation of Click Fraud", 24 pages.
Office action for U.S. Appl. No. 11/625,069, mailed on Sep. 24, 2012, Feige et al., "Allocating Rebate Points", 26 pages.
Chinese Office Action mailed Mar. 21, 2012 for Chinese patent application No. 200780004397.X, a counterpart foreign application of U.S. Appl. No. 11/419,896, 7 pages.
Office Action for U.S. Appl. No. 11/419,896, mailed on Feb. 23, 2012, Kamal Jain, "Ad Publisher Performance and Mitigation of Click Fraud", 21 pgs.
Office action for U.S. Appl. No. 11/625,069, mailed on Aug. 15, 2013, Feige, et al., "Allocating Rebate Points", 28 pages.
Office action for U.S. Appl. No. 11/625,069, mailed on Jun. 6, 2012, Feige et al., "Allocating Rebate Points", 22pages.
Notice of Final Rejection Received for Korea Republic of (KR) Patent Application No. 10-2008-7018935, Mailed Date: Apr. 8, 2014, Filed Date: Jan. 31, 2007, 2 Pages.
Notice of Preliminary Rejection Received for Korea Republic of (KR) Patent Application No. 10-2008-7018935, Mailed Date: Oct. 22, 2013, Filed Date: Jan. 31, 2007, 4 Pages.

* cited by examiner

SEARCH ENGINE SEGMENTATION

CROSS-REFERENCE TO RELATED APPLICATIONS

This application claims the benefit of U.S. Provisional Application Ser. No. 60/764,618, filed Feb. 2, 2006, entitled "A COMPETITIVE PERSPECTIVE ON AD-AUCTION." This application is also related to co-pending U.S. patent application Ser. No. 11/419,881, entitled "EMPLOYING CUSTOMER POINTS TO CONFIRM TRANSACTIONS", Ser. No. 11/419,802, entitled "MERCHANT RANKINGS IN AD REFERRALS", Ser. No. 11/419,859, entitled "AD TARGETING AND/OR PRICING BASED ON CUSTOMER BEHAVIOR", and Ser. No. 11/419,896, entitled "AD PUBLISHER PERFORMANCE AND MITIGATION OF CLICK-FRAUD", all of which were filed on May 23, 2006. The entireties of these applications are incorporated herein by reference.

BACKGROUND OF THE INVENTION

One of the fundamental principles of a free market economy is that resources (e.g., products, services, money . . . ) will tend to be redistributed by voluntary transactions in a manner that maximizes wealth and/or utility to all parties involved in the transactions. For example, the price paid for a particular resource in a voluntary transaction is representative of the value of that resource to each party. Thus, monetary transactions provide a common measuring stick for comparing the relative values that different persons attach to particular resources. As such there is a natural tendency for competition between both buyers and sellers to efficiently allocate the resources and create markets that can be measured and analyzed in terms of money.

Of course different individuals will prioritize the value of resources in different ways. For example, one individual may favor higher quality while another favors lower cost, e.g., automobiles vary widely in price and quality, but ultimately, voluntary transactions between the buyer and the seller will ensure markets work efficiently from the perspectives of both supply and demand because all resources will tend to go where they are most highly valued.

Unfortunately, this efficiency can be disrupted in certain situations, such as when the value of a resource is detached from the market for that resource. Such a condition has arisen, for example, in the search engine space. Search engines are generally free for the end-user, yet it is the advertisers who pay for the use of the search engine by the end-user. Therefore, the value of the resource (search engine) is detached from the market for that resource. This unfortunate condition can also affect Search Engine Marketers (SEMs). SEMs are those who market advertising space on search engines to advertisers. SEMs are concerned with locating, researching, submitting, and/or positioning an advertisement (e.g., for a product, service, website, . . . ) within the proper search engines for maximum exposure and effectiveness. SEMs may also include the function of choosing the target keywords and keyword phrases for a website's meta tags, or some range of marketing techniques required to make the advertisement visible on search engines and/or directories so as to attract visits from a target audience.

Advertising is generally considered to be a capable means for producing revenue in most commercial markets or settings. Recently, the Internet and, specifically, Internet search engines have shown that they can be a viable alternative to conventional advertising. Accordingly, advertisers are increasingly looking toward SEMs and search engines to advertise their products and services. However, in this situation, advertisers are seeking markets for their advertisements whereas the target audience (e.g., a potential consumer) of those advertisements is seeking the perceived value of the underlying search engine. Hence, there is a separation between the value of the advertisement to the consumer (e.g., price, quality, . . . ) from the market for that resource.

One reason for this situation is because advertisers must pay for the advertisements whereas the users of search engines do not pay for exposure to the advertisements, so the users are not inclined to regard the value of the advertisements when choosing a search engine. For example, considering the user of a search engine is not likely to be using the service to find advertisements, the underlying value of an advertisement is not driven by the market for such. Hence, unlike the advertiser, the search engine provider is not motivated to obtain advertisements that are highly valued from the viewpoint of the user, even though advertisements may be the only source of revenue to the search engine provider. Rather, search engine providers are inclined to only accept advertisements from advertisers who paid the most for that space. In essence, there is no longer an effective price competition mechanism because search engines do not need highly valued advertisements in order to maintain or increase market share among users. Moreover, this market inequity has been further exacerbated by an effective oligopoly among search engine competitors that has begun removing alternative markets. This situation undermines the advertiser's ability to respond to price competition among the search engine providers.

This is an inefficient scheme for consumers because they may not be presented with the most highly valued ads. It is also inefficient for search engine competitors, because, while ad sales may be the primary (or only) source of revenue, this revenue source is driven by the search engine's market share among users, which is not conventionally enhanced by ad space. Similarly it is inefficient for advertisers who are increasingly faced with either higher costs and/or dwindling user exposure to ads without regard to the merits of the advertisements.

Currently, there is no good way to unite the value a consumer places on an ad with the price the advertiser must pay the host of the add in order to form a viable market dynamic. Recent attempts have been made to provide rankings for ad space. One such system in use today is simply to auction the ad space to the highest bidder. Of course this method simply maintains the status quo, leaving advertisers with no bargaining power other than money, and depriving consumers of markets for highly valued ads from advertisers with low marketing budgets. Another way of ranking ad space is to calculate a click-through rate (CTR).

The CTR is an estimate on the probability that a user clicks an ad if the ad is shown. Generally, the CTR is based upon prior click history of the ad, yet oftentimes, an advertiser only pays the host of the ad (e.g., a search engine provider) when a user actually clicks on the advertisement, for example pay-per-click (PPC). In another example, the user can be rewarded for clicking on the ad instead of or in addition to rewarding the host. However, these schemes inherently rely on the notion that the value of the ad to the user will be fairly represented based on the number of users who click it, and thus, it would be an appropriate measure of the value of the ad space to the advertiser to be employed with the CTR estimate. Unfortunately, in both case, this could lead to "click fraud" wherein both the user and the host are motivated to defeat the advertiser's goals. For example a user is induced to merely click on ads, either for the user's own gain or for the gain of the host (e.g. when the host provides a "kickback" to the user), rather than for a bona fide interest in the advertiser or for a genuine desire to even consider the advertisement. Accordingly, for CTR to remain a viable ranking measure, click fraud should be mitigated. Another scheme employed by search engines is to reward users for search activity. However, this could lead to a similar type of activity fraud wherein the users might search only for the sake of the reward rather than for genuine reasons. Such search activity is not very useful to attract advertising dollars, and should be mitigated as well.

Conventional ranking systems tend to rank ads only from the perspective of the underlying host, with no good mechanism to account for the values and behavior of the advertisers and consumers. Accordingly, there is a strong need to provide a way of ranking ad space that diversifies the bargaining power among the actors, sets competitive market dynamics and re-introduces efficient price-competition to SEMs and the web search engine market.

Additionally, in the Internet search engine space, there does not exist an ability to monitor transactions between an advertiser and a consumer, even if the consumer was directed to the advertiser's website by the search engine and the transaction took place entirely online. Unlike well-known auction websites that require a great deal of personal information and legal contracting, the search engine providers typically do not care if consumers are satisfied with an advertiser as long as the top dollar is paid for the ad space. Conversely, consumers do not currently view search engine providers as an outlet to settle disputes because they cannot monitor the transactions. Thus, a way for search engine providers to confirm transaction and react to feedback and disputes between consumers and advertisers would be of great benefit.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The claimed subject matter disclosed and claimed herein, in one aspect thereof, comprises a mechanism that can confirm transactions without expressly monitoring those transactions. To the accomplishment of the foregoing and other related ends, transactions can be confirmed based upon feedback. Conventionally, in the Internet advertising space, monitoring transactions has not been feasible because from the perspective of the search engine provider (SEP), the transaction occurred remotely between two third-parties, with the provider acting only as an agent to unite the buyer and seller. As such there was no convenient way to monitor those types of transactions. However, if the agent were to receive feedback from either of the third parties, this could be evidence that a transaction did occur. For example, if a visitor to the search engine provider website (SEW) clicked on a merchant's ad and proceeded to purchase from the merchant, then feedback from either the visitor or the merchant could constitute a verification of the purchase.

In accordance with another aspect of the claimed subject matter, the feedback can include valuable information regarding the experience of the transaction. For example, if the parties are satisfied, then positive feedback can be provided or inferred, whereas if one of the parties is dissatisfied, feedback can be negative. Accordingly, this feedback can be applied to rankings for merchants and/or customers, and used in a variety of ways. Moreover, this feedback can be employed, e.g., in connection with a customer satisfaction rating, which can be a factor in determining an advertiser ranking (e.g., the quality of the advertiser based upon customer satisfaction). The advertiser ranking can be used in connection with a valuation and/or pricing mechanism in order to determine an equitable amount to charge an advertiser for advertising on the SEW.

For example, certain convention search engine providers allow advertisers to bid for ad space, and the valuation (e.g., the amount charged) is simply a price-per click (PPC) bid. Another example is a function that multiplies the bid and the click-through-rate (CTR) to obtain the valuation. However, in both of these cases, the advertiser does not have an effective price-control mechanism, and further by employing CTR, the mechanism becomes susceptible to click fraud. In accordance with the claimed subject matter, a new valuation mechanism can be employed that utilizes, e.g., a function that is the product of the bid, CTR and advertiser ranking. This mechanism can give advertisers a price control mechanism and an incentive to satisfy customers, as well as mitigating click fraud because only customers who complete transactions with the advertiser can contribute to the advertiser ranking (e.g., by way of customer satisfaction feedback).

Additionally or alternatively, in another aspect, a mechanism for distributing points can be employed. The points can be utilized both as an incentive to merchants to advertise on the SEW as well as an incentive for customers to buy from the merchant by way of the SEW. For example, the points can be issued by the SEP to merchants who advertise on the SEW, e.g., based upon advertising dollars the merchant spends. In turn, the merchants can distribute those points to customers that buy from them and the points can be redeemable for value by the SEP. In addition, the SEP can keep track of the points in a "points account" associated with individual customers as another means of confirming that a transaction occurred (e.g., the customer normally would not have received points unless a purchase was made from a merchant advertising on SEW). It should be appreciated that the points can also be issued directly to consumers by the SEP, e.g., when the customer buys directly from the SEP and/or provides feedback.

In accordance with another aspect of the claimed subject matter, the points customers redeem to the SEP can be used to purchase products, services, memberships, etc. offered by the SEP as well as promotions by third parties. In one aspect, the product offered can be non-transferable software in which a licensing key can be linked to information pertaining to the customer. As an additional advantage, the information obtained by virtue of feedback and/or points can be used to implement a frequent buyer program to provide more incentives to customers. As can be seen, the SEP has a strong incentive to obtain feedback from customers (e.g., to get reliable data about the quality of merchants). Accordingly, the SEP can optionally require the customer to give feedback about the underlying transaction when points are redeemed to the SEP.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DESCRIPTION OF THE INVENTION

Figure 1:
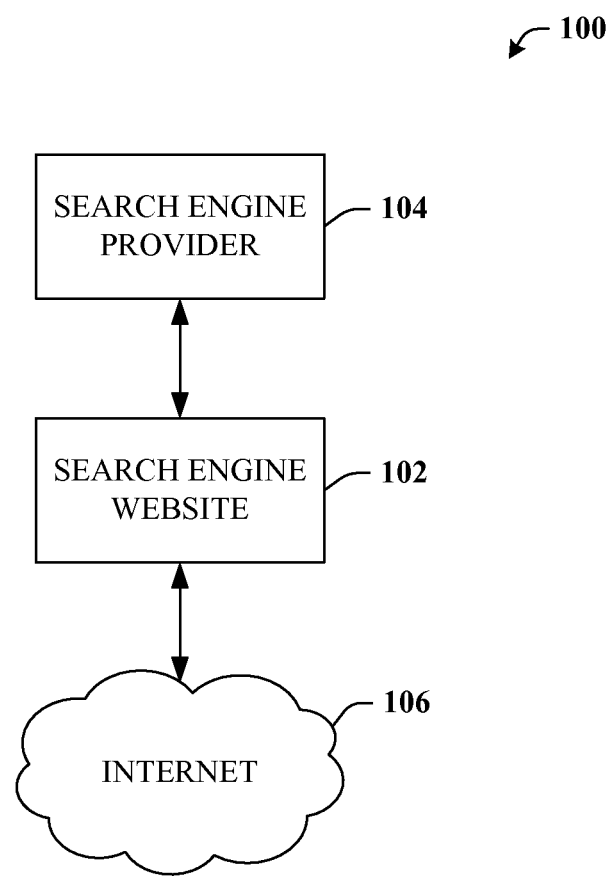
FIG. 1 is a block diagram that ranks advertisers and/or consumers and facilitates equitable use of advertising space.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used herein, the terms "Internet" and "World Wide Web" can be substantially interchangeably and can be used to refer to a network of computer networks which operates world-wide using a common set of communications protocols, electronically linking a substantial portion of the uniform resource locators stored by InterNIC. As used herein, the term "website" can be described as follows. The entire collection of web pages, documents and/or other information (e.g., images, sound, and video files, . . . ) that are made available through the Internet and generally appear to be a single web destination. As used herein, the term "search engine" can be used to refer to a component of the Internet employed to help users find websites based upon key words. Search engines can maintain data stores of websites and/or use software programs such as "spiders", "robots" and/or "crawlers" to collect information for the data stores, which is then indexed. A search engine can be used synonymously with Internet "directories", but can also be distinguished by the ordering/indexing of the websites. It is to be appreciated that search engines can be comprised of both hardware and software.

Referring initially to FIG. 1, a computer implemented system 100 that ranks advertisers and/or consumers and that facilitates equitable use of advertising space is depicted. Generally, the system 100 can include an Internet search engine website (SEW) 102 that can be hosted and/or maintained by a search engine provider (SEP) 104. Thus, the advertiser can pay a fee to place an ad on the SEW 102 in exchange for the exposure to the user base of the SEW 102. The SEW 102 can be accessed by way of the Internet 106 and/or the World Wide Web. Like conventional search engines, the SEW 102 can provide an indexed data store of a subset of all the websites world-wide accessible by way of the Internet 106, as well as advertising space to an advertiser (not shown). It is to be appreciated that although the inventions discussed herein are primarily described within the context of advertising on search results pages, the inventions can likewise be applied to content pages of primary (e.g., platform provider) as well as third parties (e.g., agents, merchants, consumers). Moreover, aspects of the inventions can be used not only in the online ad setting but also, e.g., for job searchers, head hunters, and employers as the customer, agent and merchant.

Conventional search engines providers usually sell the ad space to the highest bidder based upon a pay-per-click (PPC) scheme and/or set the fee for the ad space according to a click-through-rate (CTR). However, these schemes have proven to be counterproductive for both consumers and advertisers, and ultimately inefficient to the search engine industry as well. These schemes or business models are anti-competitive as evidenced by the extremely high profit margins of the top two search engine providers. However, the market share for these search engine providers continues to increase, establishing an "information monopoly." Moreover, these models do not account for the true value of the ad to consumers or compensate for click fraud, wherein a user clicks on an ad, perhaps numerous times, for the incentives provided rather than due to an interest in the advertiser In contrast to conventional ad pricing models, the price charged to an advertiser to host an ad on the SEW 102 can vary according to an advertiser ranking as well as a subset or combination of the conventional pricing models and/or other factors that are described infra. The advertising ranking can be computed and/or derived by the SEP 104 based upon a rating provided by the consumer who clicks on an ad displayed on the SEW 102 and, subsequently completes a purchase for a product or service from the advertiser. By employing rankings (e.g., advertiser ranking, customer ranking), SEP 104 can demonstrate to advertisers the value of advertising on the SEW 102.

For example, the SEP 104 can provide to the advertiser real economic incentives; exposure to current and/or future goodwill; mitigation of click fraud; and exposure to high quality buyers that produce more purchase per click-through than other models. As a result, the SEP 102 can attract advertising business away from the market share leaders even in an environment in which advertisers have historically been forced to follow market share despite the increasing costs. Ultimately, market share leaders may be forced to start competing on value rather than on market share, which is better for everyone. Consumers can gain exposure to more diverse markets and advertisers can gain an effective pricing mechanism to advertise.

It is to be appreciated that the website hosting the ad need not be a SEW 104, but can be other websites such as content websites with ad space. As well, the model described herein can be employed in connection with a newspaper, magazines, radio television, etc. For example, a "pay-per-call" scheme can be employed that is analogous to the PPC described supra. Moreover voice-over IP (VOIP) e.g., utilizing Internet telephony could be employed to popularize a pay-per-call model.

Figure 2:
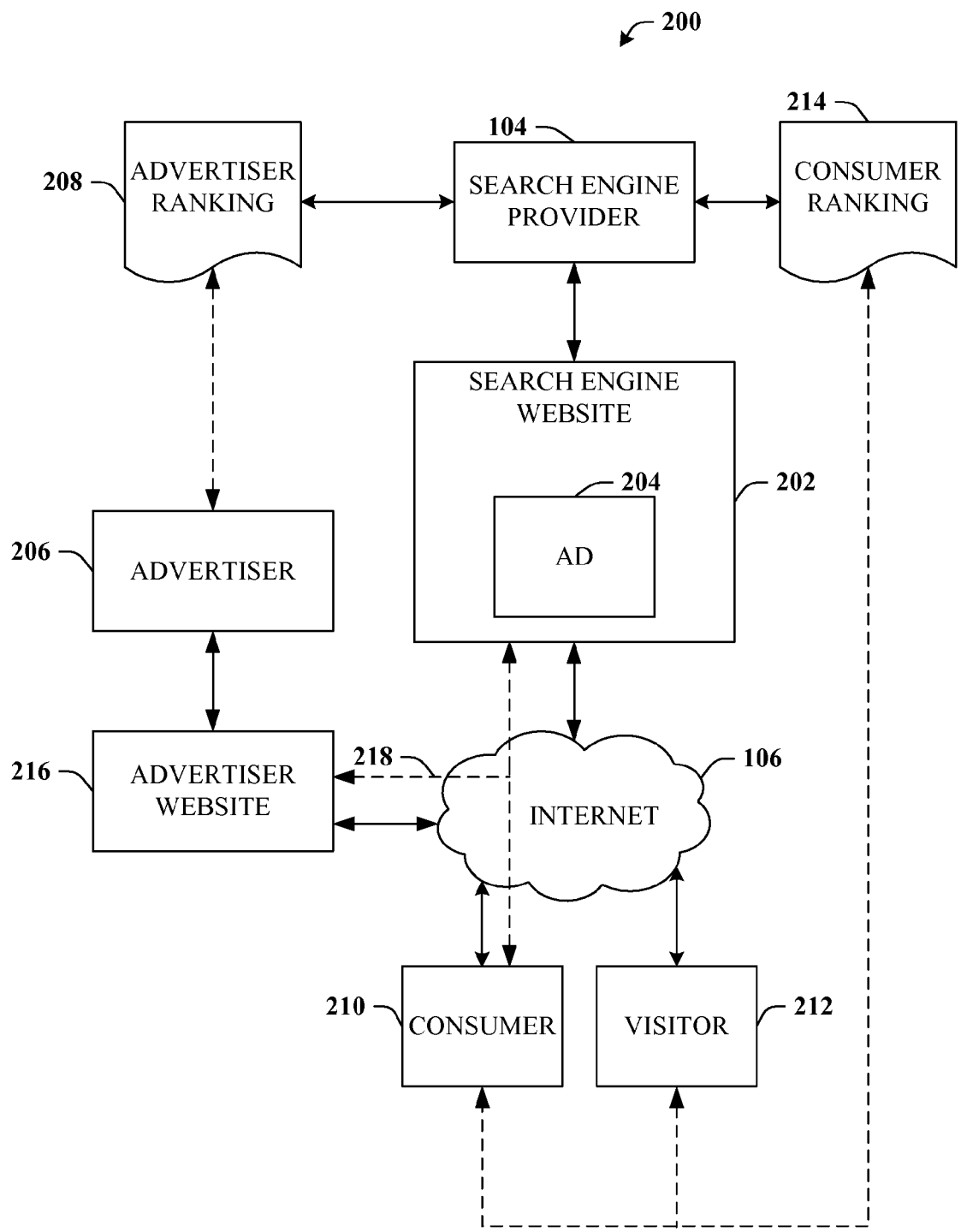
FIG. 2 is a block diagram that illustrates a more detailed system that ranks advertisers and/or consumers and facilitates equitable use of advertising space.

Referring now to FIG. 2, a computer implemented system 200 that ranks advertisers and/or consumers and facilitates equitable use of advertising space is shown. Generally, the system 200 can include a SEW 202 coupled to the Internet 106 that can host an ad 204 for an advertiser 206 at a price that varies according to an advertiser ranking 208. Also depicted is the SEP 104 that hosts and/or maintains the SEW 202 and that can compute the advertiser ranking 208 based at least in part upon a rating from a consumer 210 who clicked on the ad 204 and completed a purchase from the advertiser 206. It is to be appreciated that the SEW 202 is substantially similar to the SEW 102 and 104 (FIG. 1), respectively, but provided here in more detail. Accordingly, aspects described in FIG. 2 can equally apply with respect to FIG. 1 and vice versa. It is also to be appreciated that components and/or elements labeled 204-218, respectively, can exist in the plural, but are shown here as single components and/or elements for the sake of brevity, but can be referenced in the plural form and each can have individual characteristics that are distinguishing As shown, the consumer 210 and a visitor 212 access the SEW 202 by way of the Internet 106. It is to be understood that both the consumer 210 and the visitor can access the SEW 202 by conventional means known in the art such as by employing a web browser application that runs on a computer and/or other device. The SEP 104 can provide a consumer ranking 214 to the consumer 210 and/or the visitor 212, which can be employed to determine the ad 204 to be displayed upon access to the SEW 202. The consumer ranking 214 can be based upon past purchases, past clicks on ads 204, whether the consumer 210 is a new or frequent customer, the percentage of clicks-throughs 218 that resulted in a purchase, demographics information, and the like. One distinction between the consumer 210 and the visitor is that the consumer 210 is typically considered to have clicked on the ad 204 and redirected to the advertiser website 216 by way of the click-through path 218 (shown with broken lines with longer dashes) and subsequently completed a purchase from the advertiser 206. In contrast, the visitor 212 can have been exposed to the ad 204, but has not clicked on the ad 204 (although visitor 212 may do so at a later time or may have clicked on other ads 204).

The SEP 104 can save data to a data store (not shown), including advertiser rankings 208 and consumer rankings 214, each advertiser ranking 208 can be associated with a particular advertiser 206, and each consumer ranking 214 can be associated with either a consumer 210 or a visitor 212 as indicated by the broken lines with shorter dashes. The SEP 104 can also store, track, modify, index, analyze, etc. other data just as conventional search engine providers do, as well as data that can be particularly employed to compute the rankings 208, 214, e.g., data that is not available to conventional search engines.

As will be described in more detail below, the claimed subject matter can provide improvements over conventional search engine provider business models. For example, both consumers 210 and advertisers 206 can now prioritize how to assign value in the advertising space, opening up new markets that are no longer one-sided, but range the spectrum of quality versus economy. Additional value can be provided to the advertisers 206 by enabling the advertisers 206 to participate in the marketing of search ads 204 to consumers 210. As a result, more opportunities are provided to the search engine marketers (SEMs).

To the accomplishment of the foregoing the rankings 208, 214 play a role, and can rely upon data that historically has not or could not be collected by conventional systems. In particular, much of the data employed to determine the rankings 208, 214 can be post-transactional data, e.g., data that is collected after a consumer 210 has made a purchase from an advertiser 206. Due to the inability of conventional systems to monitor transactions after an advertisement is clicked the extent of the data previously monitored was little more than that a potential buyer was redirected resulting in a click-through fee.

However, according to one aspect of the claimed subject matter transactions between the consumer 210 and the advertiser 206 can be recorded even without traditional means of monitoring the transaction. For example, an advertising ranking 208 can be scored based upon feedback from the consumer 210. Hence, feedback from the consumer 214 and/or the advertiser 206 can provide a basis for establishing that a purchase/transaction occurred. Transactions that occur without subsequent feedback from the consumer 210 can be considered by default to be positive, but this need not be the case. Alternatively, in some cases no feedback report can incur a slight negative adjustment to the advertising ranking 208, thereby encouraging the advertiser 206 to provide the consumer 210 with an incentive to provide some feedback. Moreover, the consumer ranking 214 can be adjusted positively for consumers 210 who provide feedback as another incentive. However, in the last situation, it should be appreciated that the consumer ranking 214 adjustments for consumers 210 that provide negative feedback may not be as great as for consumers 210 that provide positive feedback because in the case of negative feedback the consumer 210 already has an incentive to report on the purchase and the resulting dissatisfaction.

As a result, the rankings 208, 214 can have an impact on the behavior of both the consumers 210 and the advertisers 214.

For example, in addition to being a multiplier for conventional rankings (e.g., auction-style bid for ad space and/or CTR), the advertiser ranking 208 can be used to set "cut-off" levels. Thus, if it is determined (e.g., due to consumer 210 feedback) that an advertiser 206 satisfies less than, e.g., 80% of consumers 210, then the SEP 104 can choose to forbid the advertiser 206 from placing an ad 204 on the SEW 202, irrespective of how much the advertiser 206 is willing to pay for the ad space. It is to be appreciated that cut-off levels other than 80% are contemplated to be within the spirit and scope of the claimed subject matter as well as multiple different cut-off levels. For instance, the cut-off level could be determined based upon the industry of the advertiser 206 (e.g., the types of goods and/or services sold, the volume of transactions, . . . ), empirical data gathered by the SEP 104, Gaussian curves normalized the block the bottom segment of advertisers 206, and even input and/or selected preferences of the consumers 210 and advertisers 206.

In addition, the cut-off level can be determined and/or inferred by the intelligence component 220. The intelligence component 220 can examine the entirety or a subset of the data stored by the SEP 104 and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Still referring to FIG. 2 and some of the advantages provided by the rankings 208, 214, it should be appreciated that consumers 210 can have more influence in the search engine ad space market. For instance, a consumer 210 directed to the advertiser website 216 from the SEW 202 by way of the click-through 218 can be afforded the assurance that an unsatisfactory purchase from the advertiser 206 can be more easily resolved. Because advertisers 206 suffer from negative feedback, the SEP 104 and advertiser rankings 208 implicitly act as a policing mechanism. In essence, the SEP 104 can be biased towards high quality merchants (e.g., advertisers 206), which benefits all parties involved, and can ultimately attract more consumers 210, which can, in turn, increase the market share of the SEP 104 in a natural, self-reinforcing market dynamic. Additionally, to further reinforce these advantages, the SEP 104 can choose to offer ad space to high quality advertisers 206 (e.g., those with superior advertising rankings 208) at a discount.

In general, the average quality of advertisers 206 with ads 204 on the SEW 202 can steadily improve over time. Moreover, consumers 210 confidence and/or trust in the SEP 104 can steadily increase as well, similar to what has been witnessed in fields other than the search engine ad space where transactions can be monitored from end-to-end, such as auction websites. Further, this confidence in the SEP 104 can establish goodwill with both consumers 210 and advertisers 208, by building value into the brand name. In turn, these advantages can improve the overall market share for purchasing over search engine providers (e.g., the SEP 104) both through more efficiently uniting buyers and sellers as well as attracting business that has historically been conducted in other venues such as internet auction venues.

However, some difficulties do exist. For example, as described, since advertising rankings 208 are based to a degree on feedback from the consumer 210, additional incentives should be provided to ensure that this feedback occurs. These additional incentives as well as other aspects of the claimed invention can be described with reference to FIG. 3.

Figure 3:
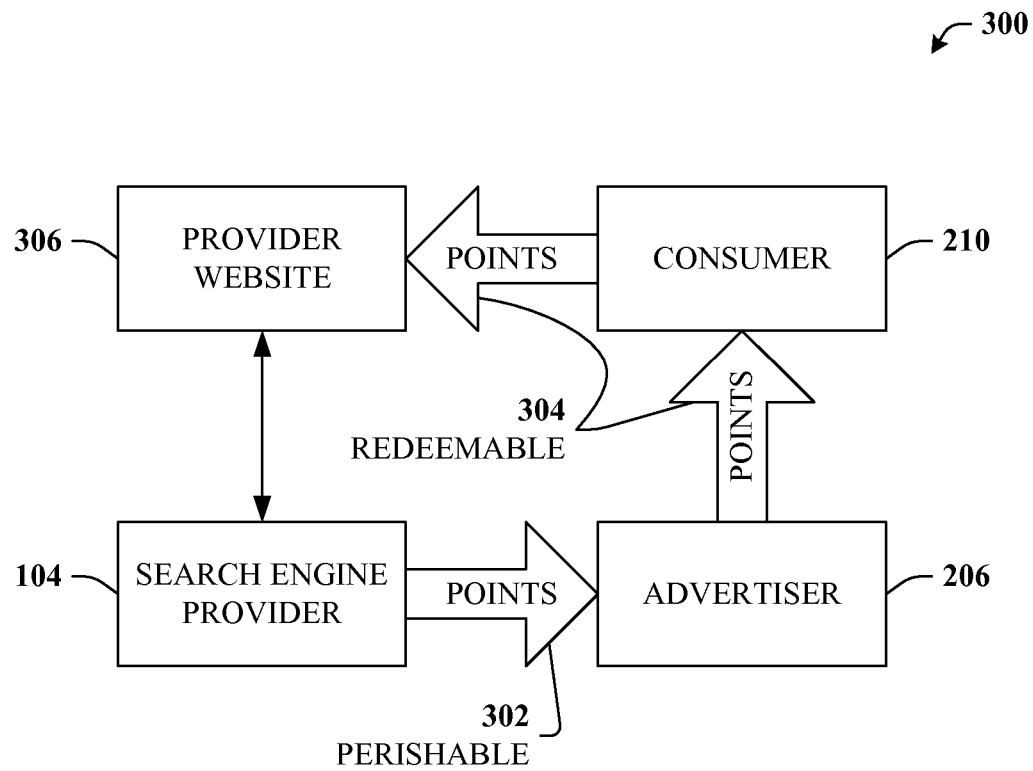
FIG. 3 depicts an exemplary block diagram of a system that distributes points to provide an incentive for customers and advertisers to use the search engine.

Turning now to FIG. 3, a system 300 that distributes points to provide an incentive for customers and advertisers. The system in general can include the SEP 104, the advertiser(s) 206, the consumer(s) 210, and an intelligence component 220 as described supra. In addition, the SEP 104 can issue perishable points 302 to the advertiser 206 as an initial way to produce the aforementioned additional incentives. The perishable points 302 can be conveyed to the advertiser 206 in exchange for money or another resource as well as a form of rebate on an amount the advertiser 206 spends on the marketing platform of the SEP 104 (e.g., the amount paid to place an ad 204 on the SEW 102 from FIG. 2). The amount of the rebate distributed in perishable points 302 can be, e.g., a straight 20% (or some other value) of the amount the advertiser 206 pays to the SEP 104 for ad space, or an amount that is determined by a variety of factors, including but not limited to the advertiser ranking 208 (FIG. 2), the product or service being offered (e.g., more points 302 for markets in which the SEP 104 wants to gain in market share), the value of the ad space (e.g., fewer points 302 when directed to visitors 212 with high consumer rankings 214 (FIG. 2)), other empirical data collected by the SEP 104, etc. Additionally, the amount of perishable points 302 issued can be derived by the intelligence component 220 in a manner similar to what was described above.

The perishable points 302 can then be distributed to consumers 210 in the form of redeemable points 304, which can be redeemed for goods and/or services (e.g., software, memberships to pay sites, . . . ) offered by the SEP 104 on the provider website 306. According to one aspect of the claimed subject matter, the perishable points 302 cannot be redeemed and therefore typically only acquire redemption value once they have been distributed to the consumer 210. As well, in order to prevent abuse or fraud, the perishable points 302 can have a relatively short lifespan, expiring after, e.g., a month, six months, etc. However, once the perishable points 302 are transferred to consumers 210 as redeemable points 304, this expiration period can be removed or extended. It is to be appreciated that the intelligence component 220 can be employed to determine an optimal expiration period (if any) for the points 302, 304.

Redeemable points 304 can also be conveyed to consumers 210 directly from the SEP 104, e.g., when the consumer 210 buys directly from the provider website 306. As can be seen, the introduction of points 302, 304 can provide additional incentives for consumers 210 to buy from advertisers 206, increasing the appeal of the SEP 104 for both. Moreover, advertisers 206 have the ability to market the points in a flexible way that suits various marketing strategies, and because purchases can be verified, click-fraud is mitigated and/or eliminated. Another advantage is that the SEP 104 can track what consumers 210 tend to purchase with the points 304, providing a rich source of information.

Furthermore, it is to be appreciated that the cost of one redeemable point 304 to the SEP 104 may be, e.g., one cent, but since the points 304 are redeemed for the products of the SEP 104, it could be valued at, e.g., 2.5 cents to the consumer 210. In that case, such an exchange would be tantamount to the consumers 210 seeing an economic benefit equal to half of the advertisers 206 market budget. As will be detailed infra, the redeemable points 304 can be exchanged for non-transferable software, which can increase the value multiplier seen by the consumer 210 from, e.g., 2.5 to 5 or more. This is similar to the effect of the consumers 210 receiving the entire amount (or more) of the advertiser 206 budget. In essence, the advertiser 206 can allocate portions of the marketing budget to improve consumer 210 satisfaction.

An additional advantage is that the redeemable points 304 can be employed as an incentive for consumers 210 to provide feedback. For example, the consumer 210 earns redeemable points 304 by completing a transaction with an advertiser 206. According to one aspect of the claimed subject matter, the SEP 104 can optionally require that a consumer 210 provide feedback about that transaction (thereby adding value to the advertising ranking 208 (FIG. 2)) prior to redeeming the points 304.

Non-Transferable Software

As described supra, redeemable points 304 can be used to purchase non-transferable software from the provider website 306. Industries that have historically had the ability to monitor transaction have used a similar concept. Hence, while a novel concept to the search engine space, the travel industry for example, has been employing a system of frequent flyer points for some time. However, in order to mitigate abuse and/or to prevent cannibalizing their own ticket business, often tickets are transferable only to friends or family, but not to strangers. Airlines often mitigate this problem by requiring ID's at the gate and/or monitoring classified ads and Internet auction sites. Non-transferable software can be provided to consumers 210 by the SEP 104 at a very low cost based upon a similar scheme. For example, software purchased with redeemable points 304 can be associated a licensing key with private information about the consumer (e.g., address, date of birth, . . . ), which a consumer 210 might be willing to share with family and friends, but not with strangers and or in other ways such as based upon an IP address, machine ID, a telephone number and the like.

For example, the activation of the non-transferable software (and/or other products and services) can embed the private information of the consumer, which the consumer does not mind sharing with friends and family, but generally would not want strangers to know. As well, the activation can require the presence of a personal asset of the consumer such as an IP address or a cellular phone connection that may be the phone number associated with the consumer whose point account balance is used to purchase the software. Hence, the use of the telephone connection of a particular person can be required, e.g., the computer makes a call from a particular telephone connection to a 1-800 number. The recipient can employ caller-ID such that if the caller-ID information matches with the information on file associated with that software, then the software is unlocked. Additionally or alternatively, a blue-tooth enabled cell phone or a SMS/text messaging capable cell phone could be employed, as well as an internet connection with, e.g., static IP address.

Mechanism for Behavior Targeting of Ad Allocation and Pricing Based on Transaction History Traditionally, ad targeting aims to reach specific audiences have been based on gender, age, geographic location, etc. In ad allocation and pricing, as proposed supra can use transaction history—a form of behavioral targeting. In particular, a mechanism can be employed to bring together merchants and consumers who are more likely to enter into transactions with each other. This can be accomplished by allocating advertising to those merchants with whom the consumer is most likely to have a transaction, as measured by the frequency or value of previous transactions of that consumer with that particular merchant or with merchants in the same market segment. For these purposes, market segments may be defined widely or narrowly. For example, alcohol or wine or French wine or Bordeaux could be considered a market segment. Other market segments could be, e.g., women's apparel, Xbox-brand games, jewelry, books, electronics, lawyers, etc.

In online auctions for advertisements (e.g., for ads on search result pages or on content websites), a function or algorithm can determine ranking of bids (e.g., allocation) and pricing. Some search engine providers currently employ an algorithm which takes demographic information into account. However, the algorithm can also rely upon or include a measure of the transaction history of the consumer, such as points accumulated (e.g., redeemable points 304) from a specific merchant (e.g., advertiser 206) and/or a specific market segment and/or overall number of points. As described, these points can be stored in a "points account" associated with the consumer as well as reflect upon the consumer ranking 214.

Accordingly, behavioral targeting can provide a better quality of ads based on personal history in the world of advertisement that goes beyond merely determining that many consumers who purchased one product also purchased a second product. Behavior targeting can be employed to target a consumer based upon a likely interest, based upon, e.g., a past transaction, clicking on a link, providing specific search terms, etc. For example, if it is determined that a consumer is interested in cameras, the consumer can be delivered ads that relate to cameras and/or camera accessories. Search ads of this type can be particularly effective when the information is determined from a current keyword. For an example a person who is interested in photography may search for "camera". Similarly contextual ads are based on an inference that a person reading an article about photography might be interested in "camera" too.

Additionally, demographic information can be employed to target ads. For example, male will likely be interested in a different kind of shaver than a female. Hence, behavioral targeting can be very useful in increasing the effectiveness of advertisements. An object can be to discover or infer what the consumer is likely to be interested in and then select the ads of a related species. For example, if a consumer's transactional history reveals the purchase of a high megapixel camera, that consumer may be interested in the high capacity memory card and such ads can be selected for display. However, it can also be an object to mitigate privacy concerns. In accordance therewith, any of the data collected about a particular consumer and/or an inference drawn as to that consumer's "behavior" can be performed exclusively by machines and/or computers without human involvement. Moreover, an option can be provided to the consumer that allows the consumer to modify and/or purge this information, either partially or entirely.

Mechanism for Ad Allocation and Pricing as a Function of Merchant Rating

The current ad allocation and pricing mechanisms use a function of the bid, the CTR, and certain demographic information. However a search engine provider (e.g., SEP 104) can employ a function which also takes into account the merchant rating provided by customers. Such a rating can be obtained e.g., by market research, or by way of current online reputation systems such as Bizrate, Epinions, Ebay, etc., or by way of the point rating mechanism described above. One implementation is to use the function is illustrated below.

$$Bid/click \times CTR \times Merchant\ rating$$

Where merchant rating is a number based on customer feedback as discussed above (e.g., the advertiser ranking 208 from FIG. 2).

Frequent Buyer Program

Drawing again from the example of airline travel concepts, the SEP 104 can also employ the notion of a frequent buyer program. Similar to airlines offering frequent flyer points and rating travelers along a tiered scale, the SEP 104 can also employ this concept, even though the SEP 104 does not typically exercise the same monitoring mechanisms and/or controls that the airline industry can. For example, a consumer 210 that accumulates, e.g., 5,000 redeemable points 304 becomes a "Silver Elite" member, 10,000 points 304 to become a "Gold Elite" member; and 15,000 points 304 to become a "Platinum Elite" member. The naming convention can, of course vary based upon, e.g., branding.

Historically, shipping charges are one of the main obstacles to Internet purchases. Thus, the claimed subject matter can mitigate this obstacle by subsidizing, either entirely or in part, the costs associated with shipping. To continue the previous example, consumers can be rewarded for achieving increasingly higher levels of status, e.g., free ground shipping for "Silver Elite" members, free second day shipping for "Gold Elite" members and free overnight shipping for "Platinum Elite" members.

The consumers are directly benefited not only in the traditional economic sense of no- or low-cost shipping, but also in that the frequent buyer status can be applied across the board to all advertisers, not merely associated with a single advertiser as is the case with traditional frequent rewards programs (e.g., frequent flyer miles from one airline typically cannot be redeemed on a different airline let alone for rewards in an entirely different industry, such as a free subscription, a free book or free shipping on the book). Advertisers have an incentive to participate by honoring the frequent buyer status of consumers because free shipping can increase sales without the expense because the shipping is subsidized by the SEP 104 rather than the advertiser. Benefits other than or in addition to free shipping are also contemplated, such as free products and services, promotional gifts, etc. Moreover, status ranks and incentives need not be limited only to consumers. For instance, similar concepts and/or incentives can apply to advertisers, e.g., for advertisers that hand out a high number of points to their customers may also receive rewards.

Frequent buyer programs can also attract compulsive shoppers (e.g., consumers 210), increasing market share. In addition, this provides the SEP 104 with an additional form of leverage. For example, since frequent buyer status can be built into the consumer ranking 214 (FIG. 2), these consumers 210 can be effectively routed toward advertising space purchased by highly ranked advertisers. In accordance with the foregoing, many of the concepts described herein can provide to the SEP 104 bragging rights and/or branding as a better consumer-friendly search engine. However, a difficulty still exists in segmenting the Internet ad search space to fragment the current monopoly in the search engine space.

Market/Product Segmentation

Figure 4:
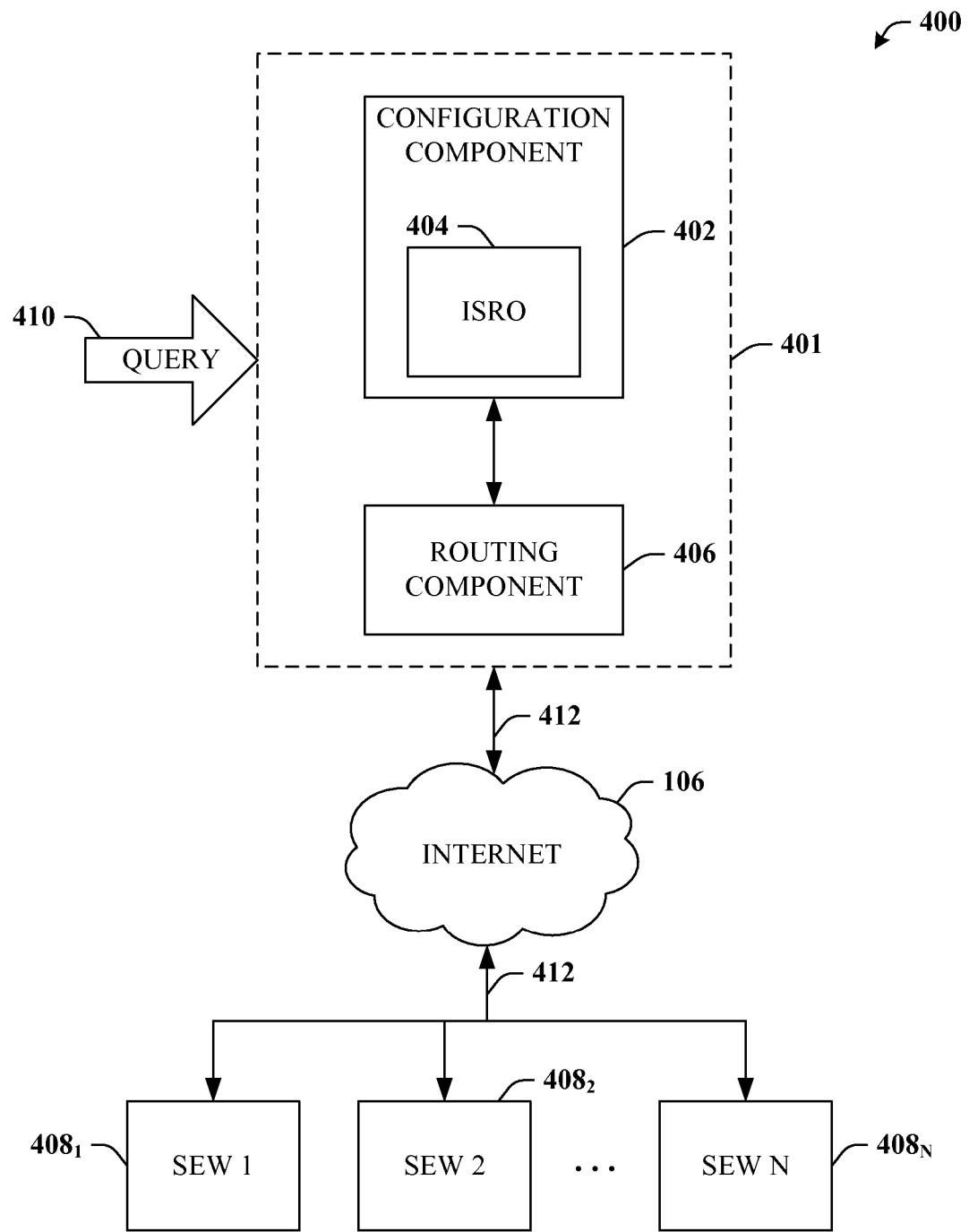
FIG. 4 illustrates a block diagram of a system coupled to the Internet that facilitates market segmentation among search engines.
Figure 5:
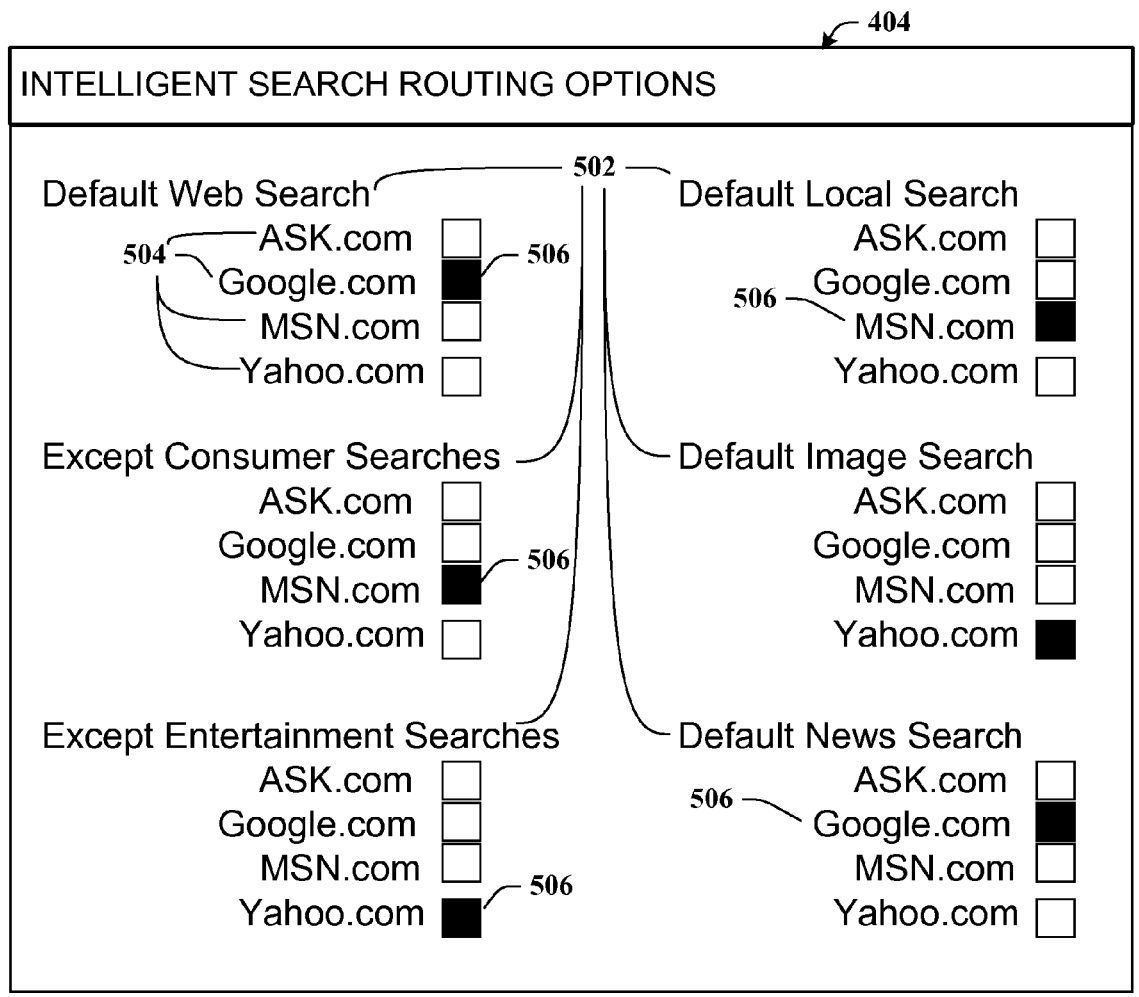
FIG. 5 illustrates exemplary intelligent search routing options that can be implemented into a web browser and/or operating system.

With reference to FIG. 4, a computer-implemented system 400 that facilitates market segmentation among search engines is depicted. Generally, the system 400 can include a segmentation component 401 with a configuration component 402 that can provide intelligent search routing options 404 and a routing component 406 that can route a search query 410 (e.g., an Internet search query) based upon the routing options 404 selected (e.g., by a user). For example, the routing component 406 can route a query 410 by way of the Internet 106 and route 412 to the appropriate SEW 408. Referring briefly to FIG. 5, exemplary intelligent search routing options 404 are illustrated in more detail. For example, categories 502 (e.g., search types 502) can be provided that distinguish different types of Internet searches 502, e.g., as a consumer search, an image search, an entertainment search, a news search, a default search, a local default search, and the like. Under each category 502, a selected 506 search engine 504 will be employed for searches of that type 502. It is to be appreciated that other categories 502 and other search engines 504 can be employed, and those displayed in FIG. 5 are provided merely for the sake of illustration and not limitation Referring back to FIG. 4, the configuration component 402 can display a plurality of search engine descriptors 504, each of which can be associated with an existing SEW (e.g., SEW 408₁-408$_N$, referred to collectively or individually as SEW 408). It is to be appreciated that although the SEWs 408 can be referred to collectively, hereafter each respective SEW 408 can have unique properties that distinguish each of SEWs 408. The configuration component 402 can also provide a plurality of search types and/or search categories 502 and for the selection 506 of the plurality of search engine descriptors 504 for each of the plurality of search types and/or categories 502 (e.g., as depicted by the search options 404). Since each of the plurality of search engine descriptors 504 can be associated with an existing SEW 408, the routing component 406 can route an Internet search query 410 through the Internet 106 along the route 412 to the SEW 408 that is associated with the search engine descriptor 504 selected 506 for the particular type of search 502.

To the accomplishment of the foregoing, the routing component 406 can compare the Internet search query 410 to a list of search terms and/or keywords in order to determine which category and/or search type 502 should be employed for the Internet search query 410. Based upon this determination, the Internet search query 410 is routed to the SEW 408 associated with the selection 506 for that particular search type 502. The list can be indexed based on, e.g., consumer searches with key words for which advertisers have bid or those key words that yield a higher probability that a consumer will click on an ad. Hence, an index of common consumer key words can be provided to the client machine (e.g., provided to at least one of components 400-406). It is to be appreciated that the delta or change to this index will likely be negligible, but the index can be updated periodically as well. Moreover, in the case where certain key words can implicate more than one category (e.g., the key word "cars" could be intended to be a consumer search for automobiles or an entertainment search for a popular musical band), a determination of the category 502 can be made base on, for example, a default priority, a pre-set selection, consumer search and/or transaction history, and the like.

Additionally, the features provided by the configuration routing options 404 and can be implemented into, e.g., a web browser or an operating system and accessed and/or selected 506 by a user by way of the configuration component 402. Therefore, the segmentation component 401 can exist as part of an operating system, a web browser, or another appropriate mechanism. As such the routing options 404 and/or configuration component 402 can provide a platform to help segment the search ad space, as well as benefiting consumers, since there is a performance disparity between many conventional SEWs 408 (e.g., one SEW 408 may be highly regarded by academics and/or highly technical users, while other SEWs 408 might be better for consumers).

As such, it is to be appreciated that the configuration component 402 and/or the routing options 404 can provide a means by which users can select 506 a default SEW 408 depending on the type of search 502 intended to be performed. According to another example, searches could be different depending upon whether the search is a pay service (e.g., sub-segmented into travel, services, merchandise, . . . ) or a free search. Without the advantages supplied by the claimed subject matter, there is an implicit assumption that "one-size-fits-all" with regard to ad space searches, which is not the case. For example, while conventional SEWs 408 favored by academics and/or highly technical people may currently have the highest market share, those SEWs 408 do not necessarily provide the best service, especially for other types of users such as the average consumer. Moreover, attempting to segment the markets to cater to consumers can be beneficial because consumer searches are, on average, more lucrative.

Figure 6:
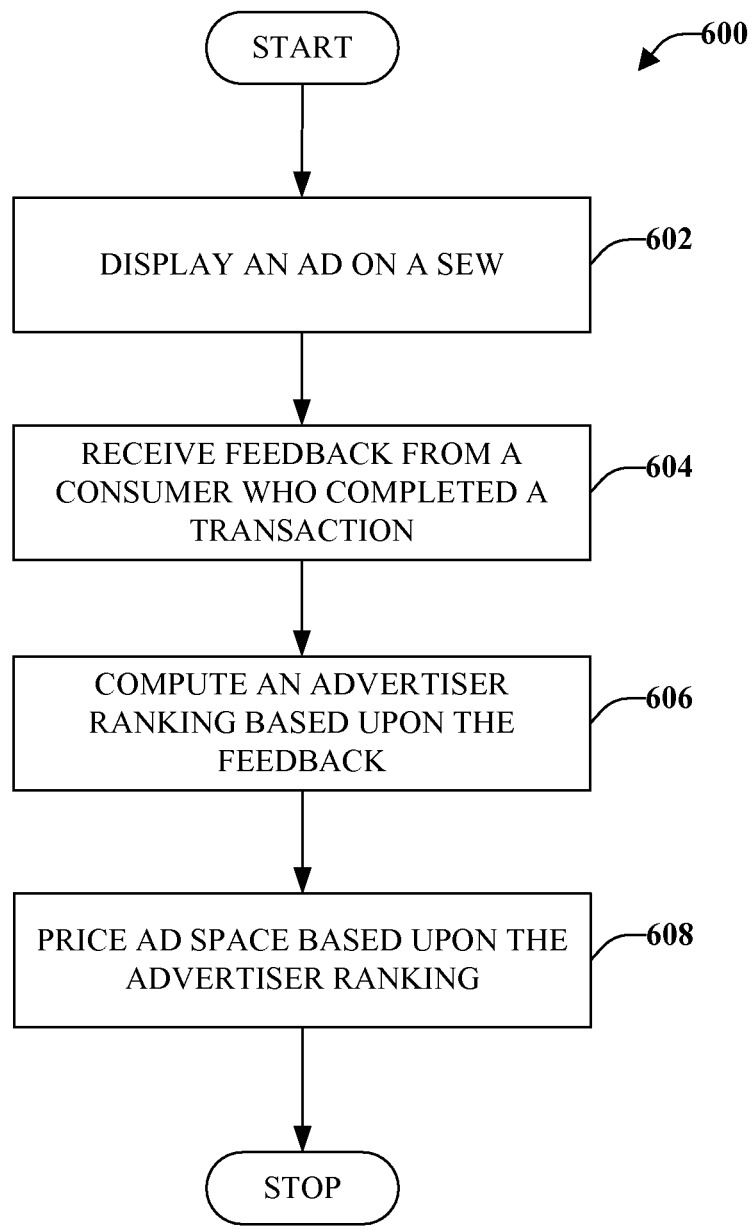
FIG. 6 illustrates an exemplary flow chart of procedures for pricing ad space based upon an advertiser ranking.

FIG. 6 illustrates a process flow diagram of a computer implemented method 600 for facilitating advertiser rankings and equitable use of ad space. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 602, an ad for an advertiser's products and/or services can be displayed on a SEW. The ad can, for example, provide a link to an advertiser website, and the SEP can collect data regarding the ad, the advertiser, the clicks on the ad, the customer and so on. The ad can contain an embedded hyperlink such that when the ad is clicked, a SEW visitor can be linked to the advertiser website, and potentially become a customer/consumer of the advertiser by making a purchase from the advertiser. Although conventional SEPs cannot monitor transactions between a consumer and an advertiser, the claimed subject matter provides a number of mechanisms to verify that a transaction has occurred.

At 604, feedback can be received from a consumer who clicked on the ad and completed a purchase from the advertiser. The feedback can, for example, verify that a transaction occurred as well as provide other information, such as the size and type of transaction, the consumer's level of satisfaction, etc. At 606, an advertiser ranking can be computed and/or updated based, e.g., upon the feedback received at 604. At 608, ad space for the ad displayed at 602 can be priced based upon the advertiser ranking as well as other factors. The pricing mechanism for the ad can thus be maximized according to consumer satisfaction and the quality of the ad from the consumer's perspective rather than the current schemes that take a shortsighted view of maximizing short-term profits to the SEP.

For instance, one known pricing mechanism is to allow advertisers to bid on ad space, resulting in a display of ads from advertisers who paid the most, irrespective of the value to the consumer. Another mechanism employed is a function of the bid multiplied by a CTR, yet this function does not accurately depict how a consumer truly values an ad because there is a strong incentive to commit click-fraud and very little in the way of prevention or effective detection. For example, click-through schemes commonly employ revenue splitting with the user who clicks on an ad or a third party publisher, which provides a monetary incentive to get as many clicks-through as possible without an incentive for those click-throughs to be germane. Moreover, even when the click-through revenue is allocated entirely to the underlying SEP, a competitor of the advertiser can be benefited by click-fraud by when the advertiser is forced to pay large marketing sums due to the click-throughs.

Accordingly, the pricing mechanism employed can mitigate click-fraud as well as account for real value to consumers by utilizing a variety of function based not only upon the bid and/or the CTR, but based also upon the advertiser ranking (which is itself a function of consumer satisfaction computed on the basis feedback provided by consumers how have verifiably made purchases from the advertiser). For example, advertisers can be ordered based upon the following function:

$$\text{Advertiser Order} = A x \times B y \times C z$$

Wherein A is the Advertiser ranking, B is the bid, C is the CTR and x, y, and z are coefficients employed to weight each of the variables according what is desired. For example, the SEP may want the Advertiser ranking to be heavily weight (e.g., x=2, 3.5, . . . ), while keeping the bid at the stated value (e.g., y=1), and giving the CTR very little weight (e.g., z=0, 0.5, . . . ). It is to be appreciated that the values given are exemplary, and any other values could be chosen (e.g., depending on the aims of the SEP) without departing from the spirit and scope of the claimed subject matter. After the ordering is established, the actual price for the ad space can be determined based upon well-known auction methods, such as the "first-price" auction, or "sealed bid" auction, the "second-price" auction, and/or the "Vickrey" auction, etc.

As can be seen, click-fraud can be reduced and the interests of both consumers and advertisers can be aligned with the interests of the SEP. For example, advertisers now have an incentive to satisfy consumers because doing so can yield a higher advertiser ranking which can ultimately reduce their advertising budget. Moreover, advertisers with high consumer satisfaction (and therefore, high advertiser rankings) will be more likely to advertise with the SEP, thus, the quality of advertisers on the SEW will increase over time. In addition, the advertiser rankings can be bolster and/or improve a merchants brand name without incurring expensive advertising programs to consumers.

Figure 7:
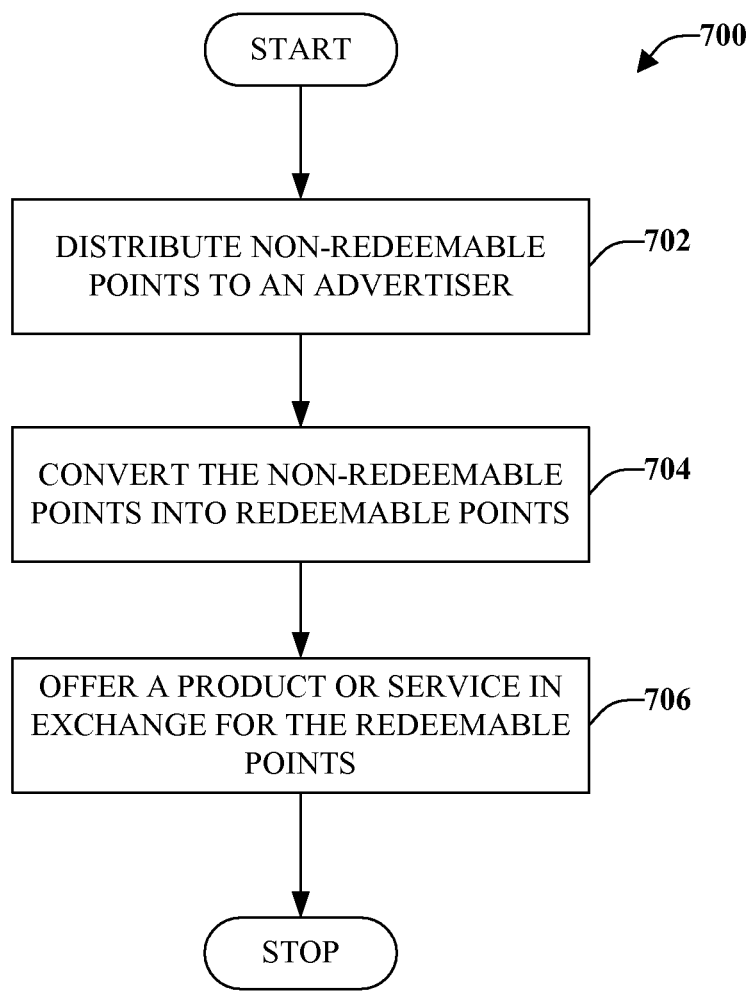
FIG. 7 illustrates an exemplary flow chart of procedures for facilitating the distribution of incentive points.

Referring now to FIG. 7, a computer-implemented method 700 for facilitating the distribution of incentive points is illustrated. At 702, non-redeemable points can be distributed to an advertiser. The non-redeemable points can be perishable to prevent abuse and to provide an incentive for the advertiser to distribute the points in a timely fashion. As well, the non-redeemable points can be distributed to the advertiser based upon the total amount of the marketing budget the advertiser allocates to the SEP (e.g., 20%, or some other proportion of the budget the advertiser spends with the SEP can be refunded to the advertiser in the form of non-redeemable points). In addition, the non-redeemable points can be purchased directly from the SEP, e.g., at a discount to the face value and/or provided as part of a promotion.

It is to be appreciated that the non-redeemable points may not have direct economic value to the advertiser since they typically cannot be redeemed. However, at 704, the non-redeemable points can be converted into redeemable points as they are transferred to consumers, e.g., consumers who were linked to the advertiser website by way of the SEW, and completed a transaction from the advertiser. At 706, products and/or services can be offered in exchange for the redeemable points. The number of points required for the product and/or service can be determined based upon an economic value of the product and/or service as well as in connection with other incentives. The number of points required can then be deducted from the consumer's points account. In this manner, an advertiser can effectively allocate a significant portion of the advertising budget directly to its customers by distributing to them the points that were received for advertising on the SEW and/or agent website.

For example, at 704 the non-redeemable points can be transferred to a points account associated with the consumer who completed the transaction with the advertiser. Normally, the number of non-redeemable points conveyed to the consumer as redeemable points will vary with the size of the transaction (e.g., the advertiser is likely to award the consumer with more points for larger transactions), and this data can be useful in a variety of ways. First, in addition to consumer and/or advertiser feedback detailed above, the transfer of points can be an additional mechanism to verify that a transaction occurred between a consumer and an advertiser. Accordingly, the transfer of points can be useful to verify that the consumer is entitled to provide feedback about that advertiser and vice versa, and, in addition, the SEP can optionally require the consumer to provide feedback prior to redeeming the points or award additional points as a way of increasing the likelihood that feedback will be provided, thereby enhancing the significance of the advertiser ranking.

Secondly, the aforementioned data relating to the type and/or size of the transaction that occurred can provide valuable information about both the consumer and the advertiser (e.g., purchase and/or sales histories). Additionally, the number of points issued to the consumer can be employed to weight the consumer feedback. For example, feedback regarding a very large purchase can affect the advertiser ranking more significantly than feedback from one or many small purchases. In this way, advertisers cannot artificially inflate the advertiser ranking by conducting a large number of small dollar value transactions wherein it is very inexpensive to replace the good or service (and therefore satisfy the customer), but disregard consumer satisfaction when very expensive items are purchased that are extremely costly to replace when a customer is dissatisfied. Additionally or alternatively to weighting feedback based upon the size of the transaction, separate advertising rankings can be applied to each advertiser based upon customer satisfaction categorized, e.g., by the price range of the product or service.

It is also to be appreciated that the products or services offered at 706 can be purchased directly by the consumer rather than merely exchanged for redeemable points. It such a case, the consumer can be awarded redeemable points directly from the SEP, which can also be redeemed by the consumer for the products or services offered at 706. Moreover, the use of points can reduce click-fraud in other ways not already described. For instance, a third party publisher may host ads for the advertiser and, as such, require fee splitting, which has conventionally been based upon only the CTR and/or the bid. However, since the points will typically only be awarded after a bona fide transaction, the value of advertising on the website of the third party publisher can be more accurately determined. For example, one website may generate a large number of click-throughs, but relatively few purchases. In that case, the advertiser who is likely paying for each click-through evaluate the real value of the advertisement and/or discover potential click-fraud.

In addition to conventional products and services, the products or services offered at 706 can also include non-transferable software or "micro-subscriptions". Micro-subscriptions can denote, e.g., a right to view a single document and/or article (or a small number of documents, but typically less than a full-fledged subscription) from a publisher that provides premium content. A consumer may be interested in an occasional document from a publisher, but not want to pay for continual access to the premium content. Thus, micro-subscriptions can enable the consumer to view only the documents of interest for a small number of redeemable points. The publishers that participate in micro-subscriptions can be benefited both economically and in terms of marketing, and the SEP can be benefited by gaining access to being able to index premium content that traditional SEW's do not provide to users entering a search query. The non-transferable software can contain a licensing key embedded with personal information about the consumer to prevent subsequent sales that might otherwise cannibalize the software provider's business, but would not interfere with transfers and/or gifts to friends and family.

Figure 8:
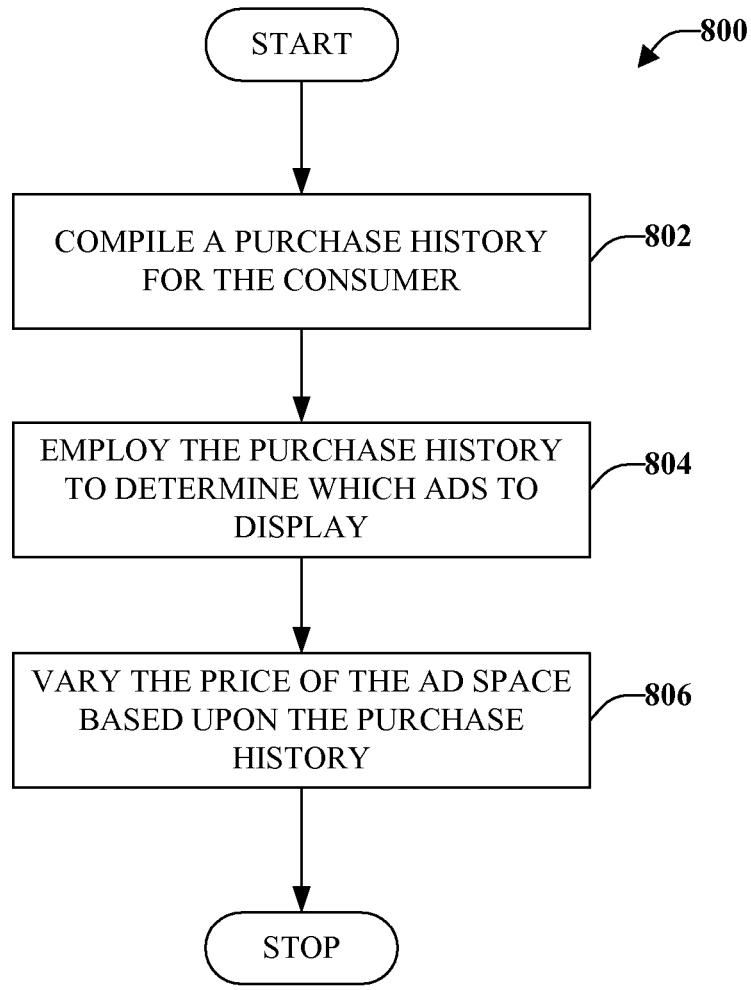
FIG. 8 illustrates an exemplary flow chart of procedures for employing purchase history and behavioral targeting.

Referencing FIG. 8, a computer-implemented method 800 for employing purchase history and behavioral targeting is depicted. At 802, a purchase history for a consumer can be compiled. The purchase history can be based upon purchases and/or transactions of the consumer that are sufficiently verified. For example, a transaction can be potentially verified when a consumer provides feedback relating to a transaction, when points are deposited into the consumer's points account, when the consumer exchanges points for products or services offered by the SEP, and the like.

At 804, the purchase history can be employed to provide behavioral targeting. For example, consumer information can be related to an IP address, a machine ID, stored in a cookie, or another means known in the art to identify the consumer to the SEW. As such, upon visiting the SEW, or as a result of a search query a determination can be made as to what ad or ads should be displayed, e.g., as a way of targeting appropriate ads to the consumer based upon the consumers purchase history. As such, the value of advertisements can be increase, which, unlike more invasive or annoying methods, is often welcomed by consumers if presented properly, as here. At 806 the price of the ad space for the ad displayed at 804 can vary. For example, since behavioral targeting can increase the value of particular ads the SEP can select only those applicable ads from particular advertisers, such as advertisers with higher advertiser rankings and/or charge a premium for the ad space.

Figure 9:
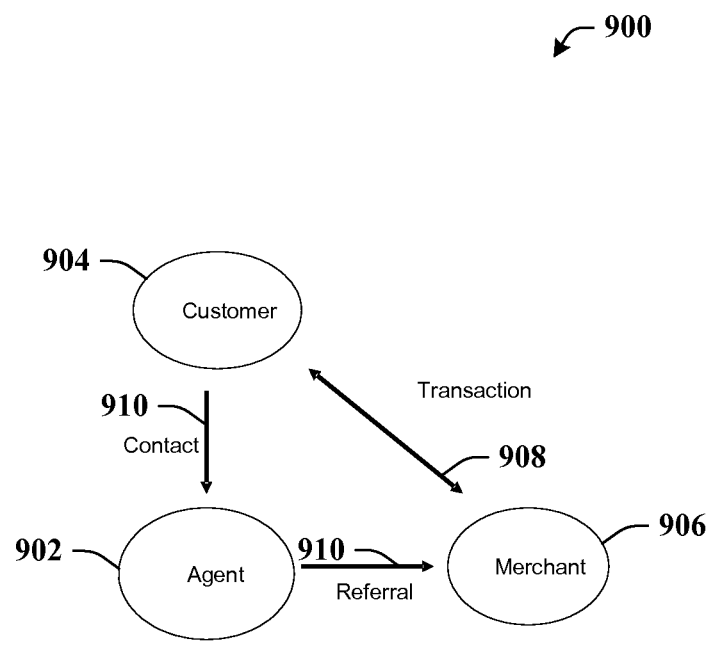
FIG. 9 illustrates an exemplary system for the verification of a transaction.

Mechanism to Confirm Transactions, Facilitate Ratings and/or Distribute Frequent-Customer Points With reference now to FIG. 9, a search ad system 900 in accordance with one aspect of the claimed subject matter is depicted. The system 900 can include an agent 902 that refers 910 a customer 904 to a third party (e.g., a merchant 906). The agent 902 may desire to confirm that a transaction between the customer 904 and the merchant 906 has actually taken place without directly monitoring it. An example of an agent 902, a customer 904 and a merchant 906 can be the SEP 104, the consumer 210 and the advertiser 206, respectively, from FIG. 2. After the agent 902 refers 910 a customer 904 (e.g., by way of a paid search or a content website) to a merchant 906, a transaction 908 may occur. Here, a transaction 908 can be anything that provides utility to the merchant 906, e.g., a purchase of a product and/or service, an acquisition from the merchant 906, or an appointment to view an item (e.g., a product or service) for sale by the merchant 906, or a call to the merchant 906 (e.g., a call to a lawyer or doctor, or other service provider), or even just a visit to a website.

The agent 902 typically does not own a bank, credit card agency or the like, which would allow him to monitor financial transactions 908 between customers 904 and merchants 906. Nevertheless, the agent 902 may desire to: 1) know whether the transaction 908 has actually taken place without having to continually monitor the merchant 906; 2) establish a frequent-customer benefit system, without having to directly monitor transactions 908 between customers 904 and merchants 906; and 3) establish a rating system, which allows customers 904 to rate merchants 906 with whom they actually had transactions 908, even though the agent 902 has conventionally had no direct means to confirm a transaction 908. The referral 910 and the contact 910 can also represent an agent transaction 910 in which a transaction with the agent 902 occurs. For example, the agent transaction 910 can be a purchase from an agent 910 by a customer 904, a distribution of points to a merchant 906 in exchange for advertising dollars, or substantially anything that provides utility to the agent 902.

The Basic Mechanism

Figure 10:
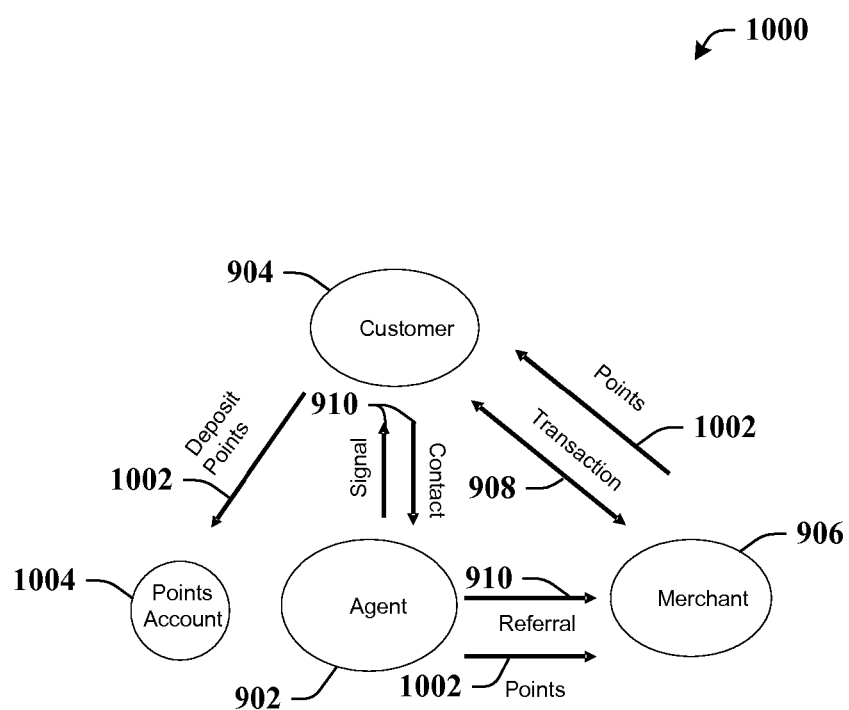
FIG. 10 illustrates an exemplary system with a points account for the verification of a transaction.

Referring now to FIG. 10, a search ad system 1000 in accordance with one aspect of the claimed subject matter is depicted. In addition to referring 910 the customer 904 to the merchant 906, the agent 902 can distribute points 1002 (e.g., points 302, 304 referenced in FIG. 3) to the merchant 906, to be used in various ways. By way of illustration and not limitation the following examples are provided: If the customer 904 and the merchant 906 actually enter into a transaction 908, the merchant 906 can convey some points 1002 to the customer 904, which the customer 904 then deposits into a points account 1004 that is typically managed by the agent 902. All messages involving distribution of points 1002 may be encrypted using private or public key cryptography to prevent fraudulent point transactions. The points 1002 thus can provide confirmation that a transaction 908 has occurred. The points 1002 can also provide benefits to the customer 904, which makes it more likely that customers 904 will demand that merchants 906 distribute points 1002.

According to one aspect of the claimed subject matter, the number of points 1002 awarded to the customer 904 may or may not be proportional the size of the transaction 908, e.g., the payment for an acquisition. In either case, the points 1002 can provide verification of a transaction 908, but in the former case, they additionally provide an indication of the size of the transaction 908.

Either the agent 902 or the merchant 906 may signal to the customer 904 that points 1002 will be distributed if a transaction 908 occurs. The merchant 906 may have a pre-announced policy of distributing points 1002, or may indicate directly how many points 1002 will be awarded for each transaction 908. The agent 902 may also signal to the customer 904 that points 1002 will be awarded for transactions 908, e.g., in the case of online advertising, by way of an automated email, a special color or a special symbol or a pop-up or preview navigation pane attached to an ad.

As described, the points 1002 given to the merchant 906 may be perishable within a certain time period (e.g., perishable points 302), and be useful only to the customers 904 of the merchant 906 referred 910 by the agent 902, but not to the merchant 906 itself or to customers 904 who made purchases that were not by way of being redirected from the from the agent 902 (e.g., not by way of click-through 218 from FIG. 2). Merchants 906 may also be allowed to buy additional points 1002 directly from the agent 902 to have more points 1002 to distribute to customers 904. Again, these points 1002 may be perishable if they are not distributed to the customers 904 within a certain time period.

Once the points 1002 are deposited in the points account 1004 associated with the purchasing customer 904, they can then be accepted as redeemable (e.g., perishable points 302 become redeemable points 304 upon transfer). As such, another expiration time period (or periods) during which the points 1002 must be redeemed can be utilized. In addition, the customer 904 could reach special status, e.g., gold status, platinum status, etc. Customers 904 who reach a higher status may have a longer period in which to redeem their points 1002, and may derive many other possible benefits—both from the agent 902 and from the merchant 906.

A Rating System Supported by the Basic Mechanism

According to yet another aspect of the claimed subject matter, a time stamp, a confirmation of a transaction 908, and/or other information can be embedded in the data used to transmit the points 1002 into the points account 1004. A customer 904 depositing points 1002 thus has a proof of the transaction 908, as well as in some cases proof of how much was paid). Base on this evidence, the agent 902 can allow the customer 904 to rate the merchant 906. The cumulative rank (e.g., advertising ranking 208) of the merchant 906 may be calculated by simply aggregating the ratings of different customers 904, or it may take into account the sizes of the different transactions 908 (as indicated by the number of allocated points 1002 or another manner), the status of the customer 904 (as indicated by the total number of points 1002 accrued in, e.g., the points account 104), or the average rating the customer 904 has given in the past (either overall, or in a given market segment, price category, etc), providing the option of a weighted average rating, rather than just an aggregate, unweighted rating.

The average rating of a merchant 906 may be used in several other mechanisms, e.g., in the determination of the price charged to the merchant 906 for the services of the agent 902 (thus encouraging merchants 906 to give better service to customers 904), as described supra with reference to FIG. 2.

A Mechanism for use With Automatic Micro-payments

Figure 11:
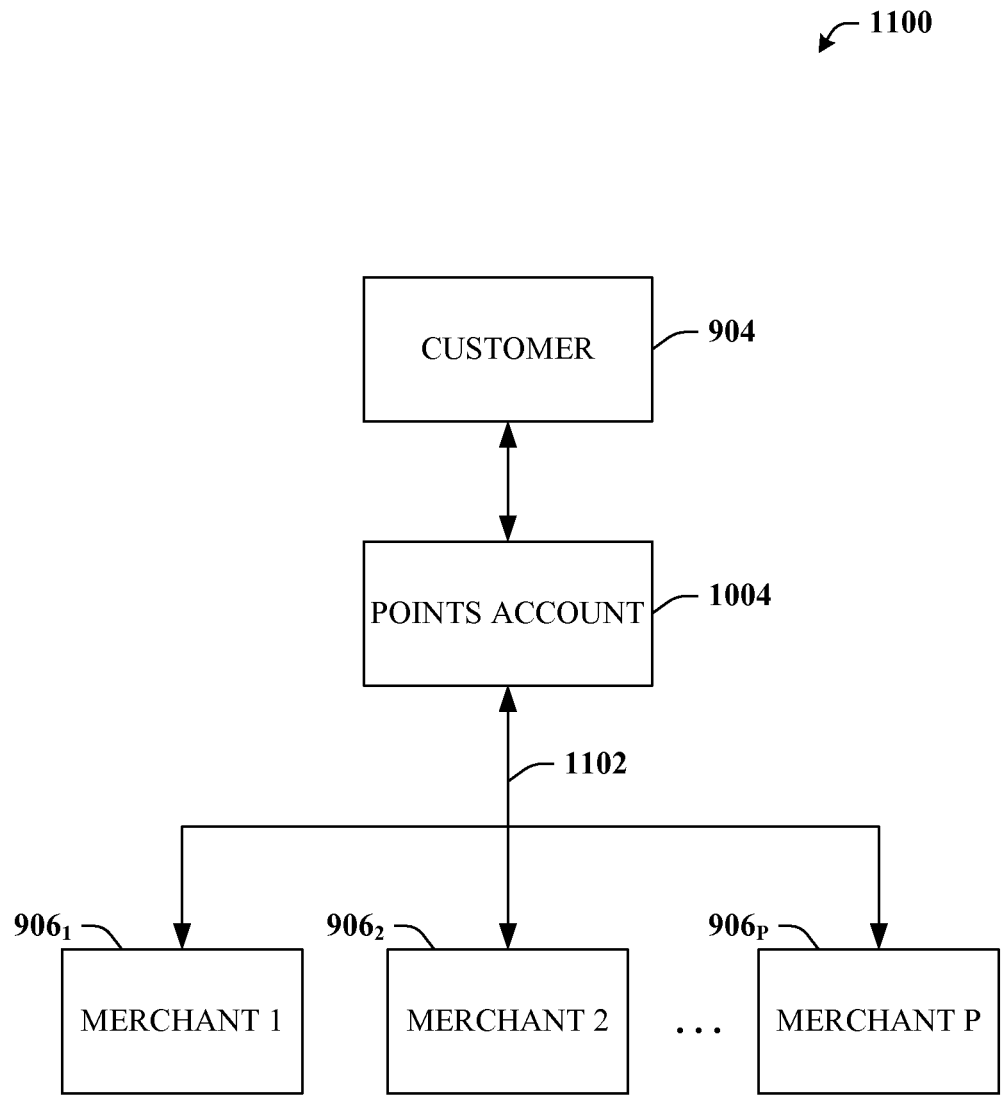
FIG. 11 illustrates a block diagram of a system that employs points to facilitate transactions between a customer and a merchant.

With reference now to FIG. 11, a system 1100 that employs points to facilitate transactions between a customer and a merchant is depicted. Generally, the system 1100 can include a points account 1004 that is associated with a customer 904. The points in a points account 1004 can be spent by way of a transaction 1102 with a merchant $906_1$-$906_P$, referred to either collectively or singularly as merchant 906. The transaction 1102 can be, e.g., an automatic "micro-payment", and thus provide a solution to conventional micro-payment difficulties. For example, there are various publishers who publish premium content. Typically, this premium content is not visible to users for free, so users are currently required to pay a periodic subscription charge to view the premium content. Some publishers may make their content viewable on per article or per view basis, yet conventionally this has been inconvenient and expensive. It has been inconvenient because a user has to pay by means of monetary instruments (e.g., a credit card) whose information the user has to provide. It has been expensive because some kind of transaction fee is generally charged for the use of the monetary instrument. Therefore, especially in the case of micro-payments, even small transaction fees are inefficient and/or infeasible.

In accordance with the foregoing, the points account 1004 can provide for automatic payments (e.g., transaction 1102) for products or services of the merchant 906. For example, if a customer 904 clicks on a link to view premium content provided by the merchant 906, the customer 904 can be shown the price in terms of points in the points account 1004 required to view the premium content. It is to be appreciated that the customer 904 may be required to log into his or her points account 1004 before being displayed the price, or a cookie residing on the customer 904 machine may do this automatically as described supra. The customer 904 can then decide whether or not to view the premium content by making an appropriate selection, e.g., choosing "yes" or "no" and, thus, in some cases, have access to premium content with a single click. It is to be appreciated that if the customer 904 does not have sufficient points in the points account 1004, then an alternate means of payment can be provided.

It is also to be appreciated that the customer 904 can choose higher levels of security when being associated with the points account 1004. For example, when the customer 904 agrees to purchase the premium content by way of transaction 1102, a CAPTCHA can be displayed. As is known in the art, a CAPTCHA (Completely Automated Public Turing Test to Tell Computers and Humans Apart) can be a short puzzle that is easy to solve for humans but much harder to solve for computers. Solving such a puzzle is evidence that the point account is not accessed by an automatic software script. Additional security can be chosen as well, for example, by requiring the customer 904 to log into the points account 1004 prior to a transaction 1102 and/or requiring the customer to re-enter the points account 1004 password.

Although the micro-payment provided by the transaction 1102 has been described in connection with viewing premium content (e.g., a single document such as an article from a premium content publisher), it should be understood that many other applications can be employed. For example, the transaction 1102 can be for the purchase of other premium content such as Electronic Greeting Cards, Electronic Stationery, Music, Video, Other media content, Electronic Game Content etc. In addition, the transaction 1102 can be used for paying a fine for a late return of a book to a university or community library. In accordance therewith, what has been labeled as merchant 906 can be an advertiser, a vendor, premium content providers, an SEP, a library, and/or substantially any entity that can employ transaction 1102. It is to be further understood that transaction 1102 can also be a deposit to the points account, such as a micro-payment for refunds, credit balances or the like.

A Mechanism to Suppress Publisher Click Fraud Based on the Basic Mechanism

Another form of click fraud exists in conventional systems known as publisher click fraud. Publisher click fraud occurs when the publisher of, e.g., a website with ads clicks on his own website ads to obtain payments from an advertiser. The mechanism described herein can allow estimations of relative conversion rates (e.g., clicks into transactions) on various websites. Since publisher click fraud reduces conversion rates, a mechanism to estimate the relative performances of publishers can provide valuable information in order to remedy publisher click fraud.

A Mechanism to Estimate the Relative Performance of Ad-publisher to Fairly Distribute the Ad-earnings and to Prevent Click Fraud Some of the difficulties of fairly distributing ad-earnings exist in other forms of media as well, such as print media, radio, television, and the like. These difficulties can exist wherever there is ad brokering. For example, an ad broker may collect ads and distribute them over many different print media, e.g., different magazines. This service could be very important for regional and small scale magazines that do not have market power to attract big label ads. Such magazines could negotiate with an ad broker to get big label ads in order, e.g., to increase the profitability of small scale magazines by way of ad revenues from the big label advertiser. One major issue with this brokering model is determining how the broker should share the revenue, obtained from the advertiser, with the publisher. Sharing the revenue based on the number of copies distributed seems a likely scheme.

However, this scheme could be inequitable because a distribution of, say, ten thousand magazines in one location might attract substantially smaller business for an advertiser from a distribution of ten thousand magazines in a second location due primarily to population density and other demographic variations. There could be various other reasons as well, for example, the content could differ and hence a totally different audience is attracted by these magazines. One solution to this difficulty is to print different contact information on ads (that are otherwise identical) appearing in different magazines. As one example, a different phone number could be printed on the ads such that the publisher of the ad with one particular phone number can be paid on a pay-per-call basis, similar to the PPC scheme. Hence, a publisher has an incentive to fraudulently induce calls to the number associated with an ad appearing in its own magazine. This type of publisher fraud can also apply to radio, television as well as the Internet advertising space in the form of publisher click fraud.

Figure 12:
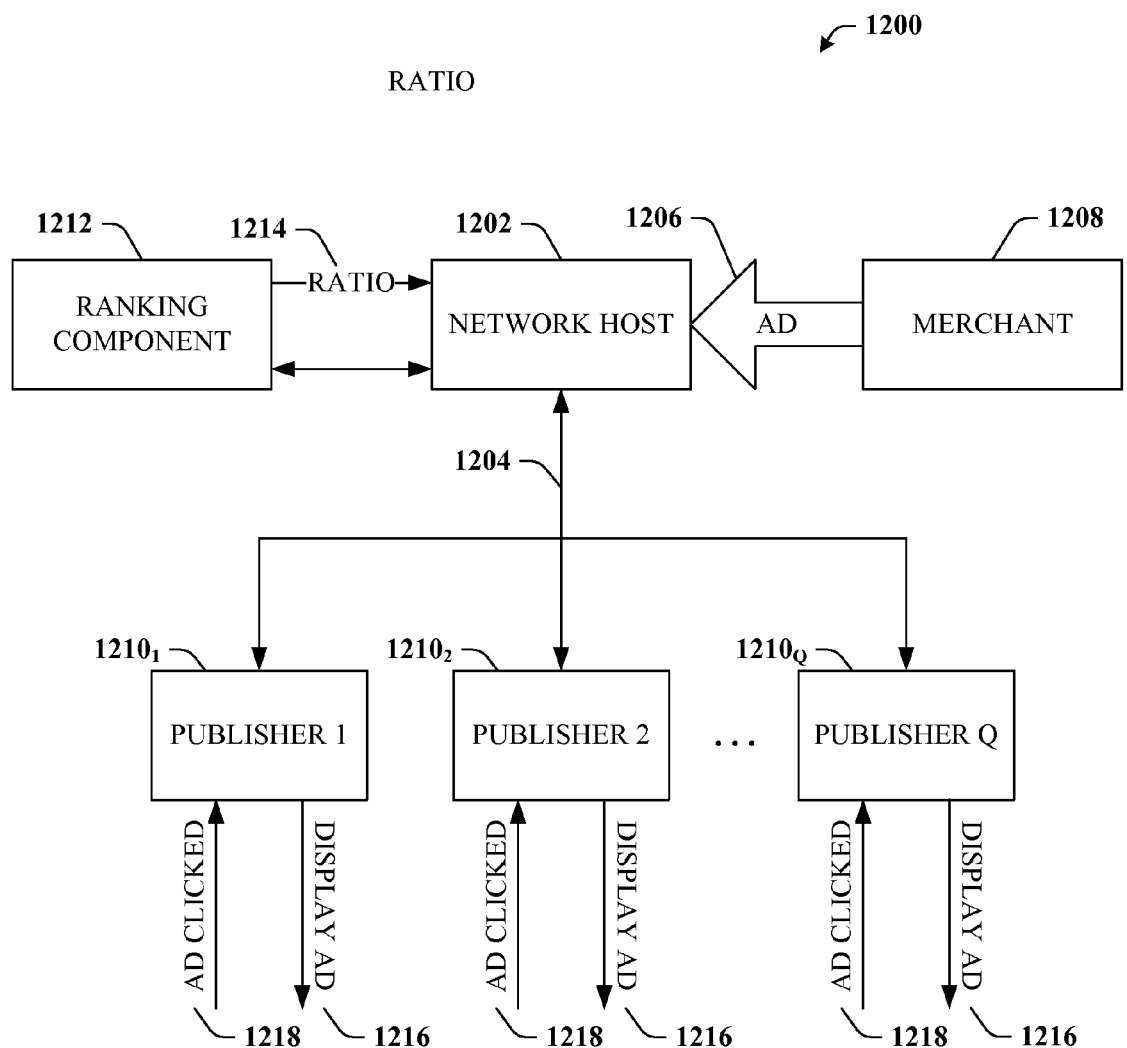
FIG. 12 illustrates a block diagram of a system that accurately estimates the performance of an ad publisher and/or mitigates click fraud.

Referring now to FIG. 12, a system 1200 that can accurately estimate the performance of an ad publisher and/or mitigates click fraud is depicted. Generally, the system 1200 can include an ad distribution network host 1202 that distributes 1204 an ad 1206 associated with a merchant 1208 to at least one ad publisher 1210$_1$-1210$_Q$, referred to either collectively or singularly as publisher 1210. The publisher 1210 choose to publish 1216 the ad 1206, e.g., in exchange for ad revenues from the merchant 1208. By way of illustration and not limitation, the ad revenues can be derived from a PPC scheme, a pay-per-impression scheme or the like. The system 1200 can also include a performance ranking component 1212 that can estimate a performance ratio 1214 for the ad 1206 based upon the performance (e.g., conversion ratio or the number of clicks on the ad 1218 that result in a transaction) the ad 1206 achieves when it is advertised 1216 by the publishers 1210. Accordingly, the amount the merchant 1208 pays to the publisher 1210 for displaying 1216 the ad 1206 can also be based upon how well the ad 1206 performs.

In the Internet ad space, an ad-distribution network is typically run by a host 1202, and the host 1202 generally distributes 1204 advertisements 1206 to various publishers 1210. These publishers 1210 can then display 1216 the ads 1206 and in return the host shares the advertisement earnings with the publishers. Currently the advertisers (e.g., merchant 1208) are commonly charged either based upon a PPC scheme, in which a price can be charged each time an ad is clicked 1218; or a per impression scheme, in which a price can be charged for each instance an ad that is displayed 1216. Regardless of which scheme is employed, there are number of difficulties that can arise and mechanisms to mitigate these difficulties.

Typically, different publishers 1210 publish 1216 (e.g., on a website) different kinds of content, and each type of content may attract widely different kinds of audiences. Moreover, these audiences may react to advertisement quite differently, so a click 1218 on an advertisement 1206 published 1216 on one publisher's website 1210 could have a different value than a click 1218 on the same advertisement 1206 published 1216 on another publisher's website 1210. For example, one publisher 1210 may be much more successful than a second publisher 1210 in producing ad-clicks 1218 and/or purchases from the advertiser, even though both publishers 1210 display the same ad 1206. The reason the first publisher 1210 is more successful could be because the audience for first publisher's website 1210 can be easily convinced to buy products and/or services on the Internet. Another reason might be the first publisher's 1210 audience has a natural propensity to purchase products and/or services on the Internet. Additionally or alternatively, the first publisher 1210 may be doing a better job displaying 1216 or otherwise marketing the ads 1206 and/or the underlying products and/or services. Accordingly, there could be several factors that affect the performance of a particular advertisement 1206 on a publisher's website 1210. One difficulty is that, previously, there has been no effective way of estimating this performance, and thus, no good way of assessing the value of ad space provided by a publisher 1210 relative to another publisher 1210. Rather, one publisher 1210 charges a similar amount of money for a click 1218 or an impression as another better or worse performing publisher 1210.

Moreover, this situation can lead to publisher click fraud, as described above, which is a second difficulty. Since publishers 1210 are getting equal money for their clicks 1218 (or impressions) irrespective of the relative value per click (or impression), there exists an incentive for the publisher 1210 to increase the clicks 1218 on the ads 1206 published 1216 on their website. Hence, a publisher 1210, or other interested party could abuse this situation by, e.g., running software scripts to fraudulently click 1218 the ads 1206 on their website (or similarly, refresh scripts to create many impressions). Alternatively or additionally, individuals can be hired, e.g., from developing countries, to manually perform the same tasks as the aforementioned scripts.

One solution to the first difficulty can be to estimate the relative performance ratio 1214 of the ads 1206 on each publisher's website 1210 separately. It should be noted that an absolute estimate of the performance is not needed because the advertiser (e.g., merchant 1208) can adjust the bid or price the advertiser is willing to pay for the advertisement 1206 based upon an approximation of the performance ratio 1214 of the publisher 1210. Hence, estimating the relative performance 1214 is sufficient. For an example, assume two publishers 1210 display 1216 the same advertisement 1206 and each publisher 1210 produces one click 1218 (e.g., from one of the publisher's 1210 user base). If, e.g., the merchant 1208 is paying $1 per click 1218 and 75% of the click price is shared with the publisher 1210, then, in conventional systems the publisher will receive 75 cents for each click 1218 on the ad 1206. However, if it is known that a click 1218 on an ad 1206 displayed 1216 on one publisher's website 1210 is about twice as likely to produce a desirable transaction for the merchant 1208 as a click 1218 on the same ad 1206 displayed 1216 on a second publisher's website 1210, then a more accurate relative performance evaluation can be made. In that case the 75% revenue ad splitting can be modified by the merchant 1208 based on the ratio 1214 of the estimated relative performance. In this example, the former publisher 1210 can be paid $1 for the click 1216 and the latter publisher 1210 can be paid 50 cents per click 1216. Accordingly, what is needed is a way to measure the relative performance of the clicks 1216.

In accordance with the claimed subject matter, one way to measure the relative performance ratio 1214 of the clicks 1218 and/or the performance of a publisher's website 1210 relative to another is by employing a points mechanism as described supra. For example, the merchant 1208 can distribute points to a customer as a result of a transaction (e.g., a valuable action for merchant 1208 performed by a user). Thus, the average number of points that are distributed by the merchant 1208 due to a click 1218 on the ad 1206 shown 1216 on a publisher's website 1210 can represent the relative performance ratio 1214 of the click 1218 on the ad 1206 displayed 1216 on the publisher's website 1210. Such a scheme also mitigates abuses due to publisher click fraud because if the publisher 1210 is producing fraudulent clicks 1218 then the relative performance ratio 1214 of the clicks 1218 on the publisher's website 1210 goes down. Hence, any benefit the publisher 1210 may get due to fraudulent clicks 1218 is mitigated or entirely neutralized.

Figure 13:
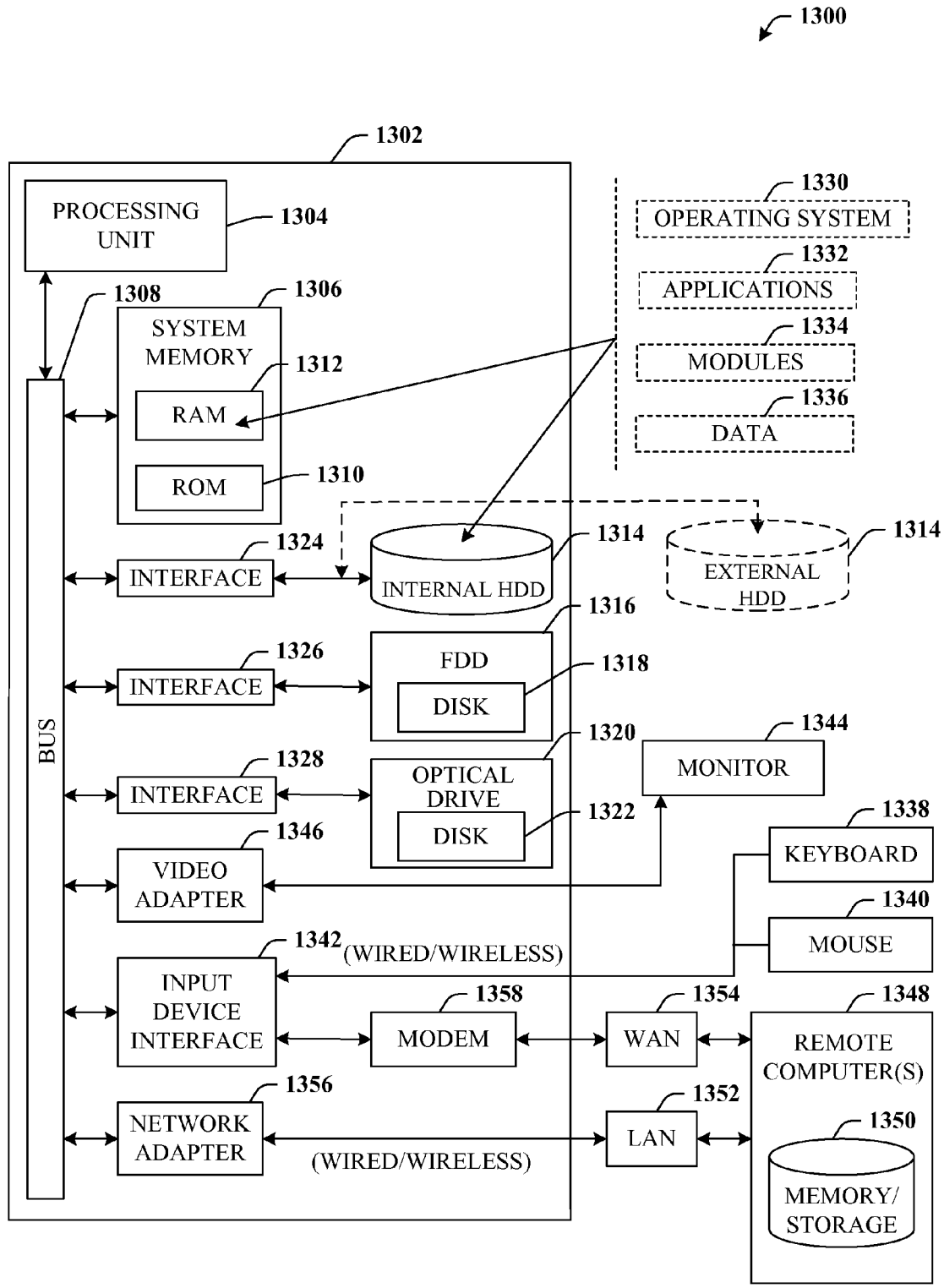
FIG. 13 illustrates a block diagram of a computer operable to execute the disclosed architecture.

Referring now to FIG. 13, there is illustrated a block diagram of an exemplary computer system operable to execute the disclosed architecture. In order to provide additional context for various aspects of the claimed subject matter, FIG. 13 and the following discussion are intended to provide a brief, general description of a suitable computing environment 1300 in which the various aspects of the claimed subject matter can be implemented. For example, various components of the systems and/or aspects thereof described supra can be implemented by way of the system 1300. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the claimed subject matter includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a nonvolatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the claimed subject matter can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
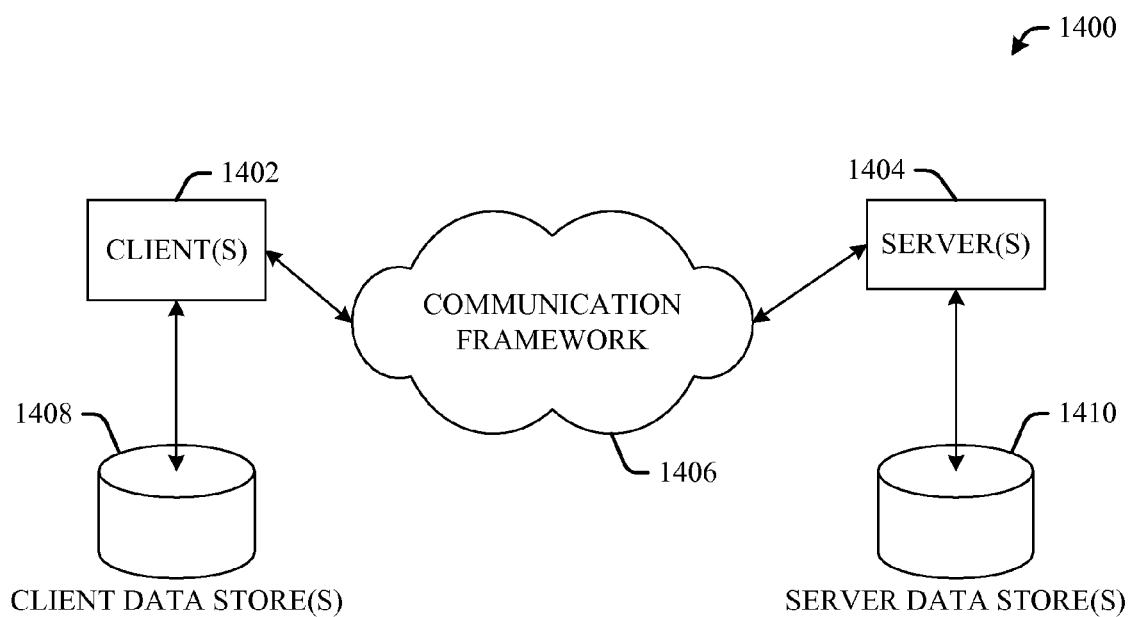
FIG. 14 illustrates a schematic block diagram of an exemplary computing environment.

Referring now to FIG. 14, there is illustrated a schematic block diagram of an exemplary computer compilation system operable to execute the disclosed architecture. The system 1400 includes one or more client(s) 1402. The client(s) 1402 can be hardware such as a digital camera with computer interface support and/or software (e.g., threads, processes, computing devices). The client(s) 1402 can house cookie(s) and/or associated contextual information by employing the claimed subject matter, for example.

The system 1400 also includes one or more server(s) 1404. The server(s) 1404 can also be hardware and/or software (e.g., threads, processes, computing devices). The servers 1404 can house threads to perform transformations by employing the claimed subject matter, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   memory;
   one or more processors; and
   a segmentation component stored on the memory and executable by the one or more processors, the segmentation component comprising:
   a configuration element that:
      displays a plurality of search types,
      displays, for a given search type of the plurality of search types, one or more representations of search engines to enable selection of a respective search engine from among a plurality of search engines, and
      receives one or more user selections associating respective search engines of the plurality of search engines with respective search types of the plurality of search types; and
   a routing element that:
      receives a search query,
      compares the search query to a set of search terms to determine a search type for the search query from among the plurality of search types, and
      determines, based at least partly on the user selections and the search type of the search query, a search engine from among the plurality of search engines.

2. The system of claim 1, wherein the configuration element further:
   stores the one or more user selections associating the respective search engines of the plurality of search engines with the respective search types of the plurality of search types; and
   bases the determination of the search type for the search query at least in part on the stored associations between the one or more user selections of respective search engines with the respective search types.

3. The system of claim 1, wherein the routing element routes the search query to the search engine associated with the search type.

4. The system of claim 1, wherein the set of search terms includes a key word list.

5. The system of claim 4, wherein the key word list is an indexed list of common search terms.

6. The system of claim 5, wherein the set of search terms includes search terms for which an advertiser has bid.

7. The system of claim 5, wherein search terms in the set of search terms yield a higher percentage of advertisement click-throughs than other search terms not included in the set of search terms.

8. The system of claim 5, wherein the search type is determined based upon at least one of a default priority, a pre-set selection, a consumer search history, and a consumer transaction history.

9. The system of claim 5, wherein the key word list is updated periodically.

10. The system of claim 1, wherein the search query is at least one of an Internet search query, a product search, and a service search.

11. The system of claim 1, wherein the plurality of search types include a consumer search, an image search, an entertainment search, a news search, a default search, and a local default search.

12. The system of claim 1, wherein the segmentation component is a component of a web browser.

13. The system of claim 1, wherein the segmentation component is a component of an operating system.

14. A computer-implemented method comprising:
presenting a plurality of query types;
presenting, for a given query type of the plurality of query types, a selectable list of a plurality of search engines;
receiving selections associating respective search engines of the plurality of search engines with respective query types of the plurality of query types;
subsequent to the receiving the selections, comparing, by a computer, a search query to a set of search terms to determine a particular query type of the plurality of query types; and
directing the search query to a particular search engine of the plurality of search engines selected for the particular query type.

15. The computer-implemented method of claim 14, wherein the set of search terms is included in an indexed list of key words.

16. The computer-implemented method of claim 15, further comprising receiving an updated indexed list of key words.

17. A computer-readable storage medium having instructions executable by a computer to:
display a plurality of query types;
display, for individual ones of the plurality of query types, respective selectable representations of one or more search engines from among a plurality of search engines employable to perform searches;
receive selections associating individual ones of the plurality of search engines with corresponding ones of the plurality of query types;
match a search query to a query type of the plurality of query types previously associated with respective ones of the plurality of search engines; and
route the search query to a search engine based on the matching query type, the matching query type determined based on a comparison of the search query to search terms that are associated with the matching query type.

18. The computer-readable storage medium of claim 17, wherein the search terms are included in an indexed list of key words.

19. The computer-readable storage medium of claim 18, wherein the instructions are further executable to receive an updated indexed list of key words.

20. A system comprising:
memory;
one or more processors; and
a segmentation component stored on the memory and executable by the one or more processors, the segmentation component comprising:
a configuration component that:
displays a plurality of search types,
displays, for individual ones of the plurality of search types, selectable representations of respective one or more search engines from among a plurality of search engines, and receives input selections associating individual ones of the plurality of search engines with a respective search type of the plurality of search types; and
a routing component that:
receives a search query, and
determines, based at least in part on one or more search terms in the search query, a search type from among the plurality of search types, and
directs the search query to one of the search engines based at least in part on the search type.

* * * * *